(12) United States Patent
Sareen et al.

(10) Patent No.: US 7,747,557 B2
(45) Date of Patent: Jun. 29, 2010

(54) APPLICATION OF METADATA TO DOCUMENTS AND DOCUMENT OBJECTS VIA AN OPERATING SYSTEM USER INTERFACE

(75) Inventors: Chaitanya Dev Sareen, Seattle, WA (US); Shaheeda Parveen Nizar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/326,583

(22) Filed: Jan. 5, 2006

(65) Prior Publication Data

US 2007/0168378 A1    Jul. 19, 2007

(51) Int. Cl.
G06F 7/00    (2006.01)
(52) U.S. Cl. .............................. 707/6; 707/102; 715/764
(58) Field of Classification Search ................... None
See application file for complete search history.

(56) References Cited

U.S. PATENT DOCUMENTS

| | | | |
|---|---|---|---|
| 5,202,828 A | 4/1993 | Vertelney et al. ............. 714/810 |
| 5,493,692 A | 2/1996 | Theimer et al. | |
| 5,530,794 A | 6/1996 | Luebbert ..................... 715/524 |
| 5,537,628 A | 7/1996 | Luebbert ..................... 715/524 |
| 5,544,321 A | 8/1996 | Theimer et al. | |
| 5,555,376 A | 9/1996 | Theimer et al. | |
| 5,563,996 A | 10/1996 | Tchao ......................... 715/521 |
| 5,596,656 A | 1/1997 | Goldberg .................... 382/186 |
| 5,603,054 A | 2/1997 | Theimer et al. | |
| 5,611,050 A | 3/1997 | Theimer et al. | |
| 5,625,783 A | 4/1997 | Ezekiel et al. .............. 395/352 |
| 5,625,810 A | 4/1997 | Kurosu et al. | |
| 5,701,424 A | 12/1997 | Atkinson .................... 715/808 |
| 5,724,595 A | 3/1998 | Gentner ....................... 715/206 |
| 5,734,915 A | 3/1998 | Roewer ....................... 395/773 |
| 5,752,254 A | 5/1998 | Sakairi ........................ 715/530 |
| 5,760,768 A | 6/1998 | Gram .......................... 345/333 |

(Continued)

FOREIGN PATENT DOCUMENTS

EP     0569133 A2    11/1993

(Continued)

OTHER PUBLICATIONS

Gnome 2.8 Desktop User Guide, Sun Gnome Documentation Team, 2004.*

(Continued)

Primary Examiner—Neveen Abel Jalil
Assistant Examiner—Vei-Chung Liang
(74) Attorney, Agent, or Firm—Merchant & Gould, P.C.

(57) ABSTRACT

Methods, systems and computer products provide for applying metadata to documents and/or document objects in local and/or remote file storage systems. Application of metadata (flags) to documents and/or document objects allows a user to easily locate and utilize flagged items. A single metadata type, such as a colored flag, may be applied to documents or document objects of different file types across a file storage system to which data is stored via different software applications. Documents and/or document objects bearing like flags may be surfaced to a user in a flag summary with which documents and/or document objects may be sorted by flag type. Flagged documents or document objects related to a launched document may be listed in an information pane adjacent to the launched document.

18 Claims, 13 Drawing Sheets

U.S. PATENT DOCUMENTS

| | | | |
|---|---|---|---|
| 5,761,683 A | 6/1998 | Logan et al. | 715/206 |
| 5,765,156 A | 6/1998 | Guzak et al. | 707/100 |
| 5,778,346 A | 7/1998 | Frid-Nielsen et al. | 705/9 |
| 5,781,192 A | 7/1998 | Kodimer | 715/770 |
| 5,798,760 A | 8/1998 | Vayda et al. | 715/834 |
| 5,801,693 A | 9/1998 | Bailey | 715/769 |
| 5,812,865 A | 9/1998 | Theimer et al. | |
| 5,838,321 A | 11/1998 | Wolf | 345/343 |
| 5,855,006 A | 12/1998 | Huemoeller et al. | 705/9 |
| 5,870,552 A | 2/1999 | Dozier et al. | 715/234 |
| 5,884,306 A | 3/1999 | Bliss et al. | 707/7 |
| 5,898,434 A | 4/1999 | Small et al. | 715/810 |
| 5,924,099 A | 7/1999 | Guzak et al. | 707/100 |
| 5,940,078 A | 8/1999 | Nagarajayya et al. | 345/346 |
| 5,958,008 A | 9/1999 | Pogrebisky et al. | 709/223 |
| 5,970,455 A | 10/1999 | Wilcox et al. | 704/270 |
| 5,970,466 A | 10/1999 | Detjen et al. | 705/8 |
| 5,999,938 A | 12/1999 | Bliss et al. | 707/102 |
| 6,002,402 A | 12/1999 | Schacher | 715/810 |
| 6,025,837 A | 2/2000 | Matthews, III et al. | 715/721 |
| 6,034,686 A | 3/2000 | Lamb et al. | 715/810 |
| 6,057,845 A | 5/2000 | Dupouy | |
| 6,065,012 A | 5/2000 | Balsara et al. | 707/102 |
| 6,177,939 B1 | 1/2001 | Blish et al. | 715/770 |
| 6,233,591 B1 | 5/2001 | Sherman et al. | 715/205 |
| 6,249,283 B1 | 6/2001 | Ur | 715/764 |
| 6,262,724 B1 | 7/2001 | Crow et al. | 715/723 |
| 6,269,389 B1 | 7/2001 | Ashe | 718/100 |
| 6,275,940 B1 | 8/2001 | Edwards et al. | 713/200 |
| 6,278,450 B1 | 8/2001 | Arcuri et al. | 345/334 |
| 6,282,548 B1 | 8/2001 | Burner et al. | 715/234 |
| 6,308,201 B1 | 10/2001 | Pivowar et al. | 709/214 |
| 6,309,305 B1 | 10/2001 | Kraft | 455/566 |
| 6,310,622 B1 | 10/2001 | Assente | 345/441 |
| 6,310,634 B1 | 10/2001 | Bodnar et al. | 715/854 |
| 6,321,242 B1 | 11/2001 | Fogg et al. | 715/236 |
| 6,389,434 B1 | 5/2002 | Rivette et al. | 715/209 |
| 6,411,311 B1 | 6/2002 | Rich et al. | 715/769 |
| 6,429,882 B1 | 8/2002 | Abdelnur et al. | 345/763 |
| 6,433,801 B1 | 8/2002 | Moon et al. | 345/840 |
| 6,448,622 B1 | 9/2002 | Easty et al. | 714/834 |
| 6,459,441 B1 | 10/2002 | Perroux et al. | 345/837 |
| 6,466,232 B1 | 10/2002 | Newell et al. | |
| 6,490,634 B2 | 12/2002 | Coiner | 719/329 |
| 6,499,041 B1 | 12/2002 | Breslau et al. | 715/505 |
| 6,513,046 B1 | 1/2003 | Abbott, III et al. | |
| 6,549,219 B2 | 4/2003 | Selker | 715/834 |
| 6,549,915 B2 | 4/2003 | Abbott, III et al. | |
| 6,572,660 B1 | 6/2003 | Okamoto | 715/272 |
| 6,606,653 B1 | 8/2003 | Ackermann, Jr. et al. | 709/219 |
| 6,618,732 B1 | 9/2003 | White et al. | 707/103 |
| 6,651,059 B1 | 11/2003 | Sundaresan et al. | 707/6 |
| 6,686,938 B1 | 2/2004 | Jobs et al. | 345/835 |
| 6,694,087 B1 | 2/2004 | Weaver | 386/52 |
| 6,704,770 B1 | 3/2004 | Ramakesavan | 709/205 |
| 6,708,202 B1 | 3/2004 | Shuman et al. | |
| 6,735,247 B2 | 5/2004 | Bates et al. | 382/282 |
| 6,747,675 B1 | 6/2004 | Abbott et al. | |
| 6,751,777 B2 | 6/2004 | Bates et al. | 715/206 |
| 6,763,496 B1 | 7/2004 | Hennings et al. | 715/205 |
| 6,789,228 B1 | 9/2004 | Merril et al. | 715/500.1 |
| 6,791,580 B1 | 9/2004 | Abbott et al. | |
| 6,801,223 B1 | 10/2004 | Abbott et al. | |
| 6,802,041 B1 | 10/2004 | Rehm | 715/201 |
| 6,810,405 B1 | 10/2004 | LaRue et al. | 707/201 |
| 6,812,937 B1 | 11/2004 | Abbott et al. | |
| 6,826,729 B1 | 11/2004 | Giesen et al. | 715/837 |
| 6,836,270 B2 | 12/2004 | Du | 345/419 |
| 6,842,877 B2 | 1/2005 | Robarts et al. | |
| 6,848,075 B1 | 1/2005 | Becker et al. | 715/205 |
| 6,918,091 B2 | 7/2005 | Leavitt et al. | |
| 6,924,797 B1 | 8/2005 | MacPhail | 345/326 |
| 6,925,496 B1 | 8/2005 | Ingram et al. | 709/224 |
| 6,944,821 B1 | 9/2005 | Bates et al. | 715/530 |
| 6,970,867 B1 | 11/2005 | Hsu et al. | 707/4 |
| 7,032,210 B2 | 4/2006 | Alloing et al. | 717/106 |
| 7,039,234 B2 | 5/2006 | Geidl et al. | |
| 7,114,128 B2 | 9/2006 | Koppolu et al. | 715/781 |
| 7,143,338 B2 | 11/2006 | Bauchot et al. | 715/503 |
| 7,165,098 B1 | 1/2007 | Boyer et al. | 709/219 |
| 7,184,955 B2 | 2/2007 | Obrador et al. | 704/231 |
| 7,185,050 B2 | 2/2007 | Eld et al. | 709/203 |
| 7,188,073 B1 | 3/2007 | Tam et al. | 705/9 |
| 7,210,107 B2 | 4/2007 | Wecker et al. | 715/883 |
| 7,254,785 B2 | 8/2007 | Reed | 715/834 |
| 7,373,603 B1 | 5/2008 | Yalovsky et al. | 709/203 |
| 7,406,501 B2 | 7/2008 | Szeto et al. | 709/206 |
| 7,454,763 B2 | 12/2008 | Veselova et al. | |
| 7,460,713 B2 | 12/2008 | Lapstun et al. | 382/187 |
| 7,555,707 B1 | 6/2009 | Labarge et al. | 715/234 |
| 2001/0032214 A1 | 10/2001 | Bauchot et al. | 707/503 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0026478 A1 | 2/2002 | Rodgers et al. | 709/205 |
| 2002/0032689 A1 | 3/2002 | Abbott, III et al. | |
| 2002/0044152 A1 | 4/2002 | Abbott, III et al. | |
| 2002/0049785 A1 | 4/2002 | Bauchot | 707/503 |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078180 A1 | 6/2002 | Miyazawa | 709/219 |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087534 A1 | 7/2002 | Blackman et al. | 707/4 |
| 2002/0087642 A1 | 7/2002 | Wei et al. | |
| 2002/0088008 A1 | 7/2002 | Markel | 725/135 |
| 2002/0089540 A1 | 7/2002 | Geier et al. | 345/764 |
| 2002/0091739 A1 | 7/2002 | Ferlitsch et al. | 707/526 |
| 2002/0099777 A1 | 7/2002 | Gupta et al. | 709/206 |
| 2002/0099817 A1 | 7/2002 | Abbott et al. | |
| 2002/0120697 A1 | 8/2002 | Generous et al. | 709/306 |
| 2002/0133520 A1 | 9/2002 | Tanner | 715/202 |
| 2002/0138582 A1 | 9/2002 | Chandra et al. | 709/206 |
| 2002/0140731 A1 | 10/2002 | Subramaniam et al. | 345/762 |
| 2002/0161800 A1* | 10/2002 | Eld et al. | 707/512 |
| 2002/0161804 A1 | 10/2002 | Chiu et al. | 707/530 |
| 2002/0184264 A1 | 12/2002 | Berg et al. | 707/513 |
| 2002/0196293 A1 | 12/2002 | Suppan et al. | 345/853 |
| 2003/0013483 A1 | 1/2003 | Ausems et al. | 455/556 |
| 2003/0014395 A1 | 1/2003 | Ruvolo et al. | 707/3 |
| 2003/0014490 A1 | 1/2003 | Bates et al. | 709/206 |
| 2003/0020749 A1 | 1/2003 | Abu-Hakima et al. | 345/752 |
| 2003/0046401 A1 | 3/2003 | Abbott et al. | |
| 2003/0050927 A1 | 3/2003 | Hussam | 707/5 |
| 2003/0069877 A1 | 4/2003 | Grefenstette et al. | 707/2 |
| 2003/0070143 A1 | 4/2003 | Maslov | 715/513 |
| 2003/0076352 A1 | 4/2003 | Uhlig et al. | 715/738 |
| 2003/0084104 A1 | 5/2003 | Salem et al. | 709/205 |
| 2003/0088534 A1 | 5/2003 | Kalantar et al. | |
| 2003/0097361 A1 | 5/2003 | Huang et al. | 707/10 |
| 2003/0100999 A1 | 5/2003 | Markowitz | 702/20 |
| 2003/0135565 A1 | 7/2003 | Estrada | 709/206 |
| 2003/0154254 A1 | 8/2003 | Awasthi | 709/206 |
| 2003/0154476 A1 | 8/2003 | Abbott, III et al. | |
| 2003/0172168 A1 | 9/2003 | Mak et al. | 709/230 |
| 2003/0172384 A1 | 9/2003 | Comps | 370/474 |
| 2003/0182450 A1 | 9/2003 | Ong et al. | 709/246 |

| | | | |
|---|---|---|---|
| 2003/0187930 A1 | 10/2003 | Ghaffar et al. ............... 709/205 |
| 2003/0196196 A1 | 10/2003 | Nylander et al. ............ 711/159 |
| 2003/0212680 A1 | 11/2003 | Bates et al. .................... 707/7 |
| 2003/0222899 A1 | 12/2003 | Alvesalo ..................... 345/716 |
| 2004/0001093 A1 | 1/2004 | Sellers et al. |
| 2004/0039779 A1 | 2/2004 | Armstrong et al. .......... 709/204 |
| 2004/0054736 A1 | 3/2004 | Daniell et al. ............... 709/206 |
| 2004/0063400 A1 | 4/2004 | Kim ........................... 455/3.06 |
| 2004/0073679 A1 | 4/2004 | Martens et al. ............. 709/227 |
| 2004/0098398 A1 | 5/2004 | Ahn et al. .................... 707/100 |
| 2004/0109033 A1 | 6/2004 | Vienneau et al. ............ 345/863 |
| 2004/0128613 A1 | 7/2004 | Sinisi .......................... 715/500 |
| 2004/0153445 A1 | 8/2004 | Horvitz et al. ................. 707/3 |
| 2004/0158611 A1 | 8/2004 | Daniell et al. ............... 709/206 |
| 2004/0168119 A1 | 8/2004 | Liu et al. .................. 715/501.1 |
| 2004/0172455 A1 | 9/2004 | Green et al. ................. 709/207 |
| 2004/0174392 A1 | 9/2004 | Bjoernsen et al. ........... 345/751 |
| 2004/0177122 A1 | 9/2004 | Appelman et al. .......... 709/206 |
| 2004/0177319 A1* | 9/2004 | Horn ....................... 715/501.1 |
| 2004/0189694 A1* | 9/2004 | Kurtz et al. ................. 345/738 |
| 2004/0194025 A1* | 9/2004 | Hubert et al. ............... 715/513 |
| 2004/0221243 A1 | 11/2004 | Twerdahl et al. ............ 715/834 |
| 2004/0230599 A1* | 11/2004 | Moore et al. ................ 707/102 |
| 2004/0243677 A1 | 12/2004 | Curbow et al. .............. 709/206 |
| 2004/0243941 A1 | 12/2004 | Fish ............................ 715/752 |
| 2004/0267625 A1 | 12/2004 | Feng et al. ..................... 705/26 |
| 2004/0267706 A1 | 12/2004 | Springer et al. ................ 707/3 |
| 2004/0268231 A1 | 12/2004 | Tunning ...................... 715/513 |
| 2004/0268263 A1 | 12/2004 | Van Dok et al. ............ 715/733 |
| 2005/0004989 A1 | 1/2005 | Satterfield et al. ........... 709/206 |
| 2005/0004990 A1 | 1/2005 | Durazo et al. ............... 709/206 |
| 2005/0005235 A1 | 1/2005 | Satterfield et al. ........... 715/245 |
| 2005/0005249 A1 | 1/2005 | Hill et al. .................... 715/810 |
| 2005/0010871 A1 | 1/2005 | Ruthfield et al. ............ 715/712 |
| 2005/0034078 A1 | 2/2005 | Abbott et al. |
| 2005/0055424 A1 | 3/2005 | Smith .......................... 709/219 |
| 2005/0064852 A1 | 3/2005 | Baldursson |
| 2005/0097465 A1 | 5/2005 | Giesen et al. ................ 715/700 |
| 2005/0102365 A1 | 5/2005 | Moore et al. ................ 709/207 |
| 2005/0102607 A1 | 5/2005 | Rouselle et al. .......... 715/501.1 |
| 2005/0102639 A1 | 5/2005 | Dove ........................... 717/178 |
| 2005/0108619 A1 | 5/2005 | Theall et al. |
| 2005/0114521 A1 | 5/2005 | Lee .............................. 709/228 |
| 2005/0119018 A1 | 6/2005 | Kim ............................ 455/466 |
| 2005/0125717 A1 | 6/2005 | Segal et al. .................. 715/512 |
| 2005/0142528 A1 | 6/2005 | Veselova ..................... 434/307 |
| 2005/0149851 A1 | 7/2005 | Mittal ......................... 715/205 |
| 2005/0154761 A1 | 7/2005 | Lee et al. |
| 2005/0165795 A1* | 7/2005 | Myka et al. .................. 707/100 |
| 2005/0166154 A1 | 7/2005 | Wilson et al. ............... 715/751 |
| 2005/0175089 A1 | 8/2005 | Jung ....................... 375/240.43 |
| 2005/0183008 A1 | 8/2005 | Crider et al. ................. 715/517 |
| 2005/0208962 A1 | 9/2005 | Kim |
| 2005/0233744 A1 | 10/2005 | Karaoguz et al. ........ 455/432.3 |
| 2005/0240590 A1 | 10/2005 | Shimizu et al. |
| 2005/0245241 A1 | 11/2005 | Durand et al. ............... 455/408 |
| 2005/0286414 A1 | 12/2005 | Young et al. ................. 370/216 |
| 2005/0289109 A1* | 12/2005 | Arrouye et al. ................. 707/1 |
| 2006/0036945 A1 | 2/2006 | Radtke et al. ............... 715/708 |
| 2006/0036950 A1 | 2/2006 | Himberger et al. .......... 715/732 |
| 2006/0036965 A1 | 2/2006 | Horn et al. ................... 715/777 |
| 2006/0053379 A1 | 3/2006 | Henderson et al. .......... 715/751 |
| 2006/0069603 A1 | 3/2006 | Williams et al. ................ 705/9 |
| 2006/0069604 A1 | 3/2006 | Leukart et al. ................. 705/9 |
| 2006/0069617 A1 | 3/2006 | Milener et al. ............ 715/501.1 |
| 2006/0074844 A1 | 4/2006 | Frankel .......................... 707/1 |
| 2006/0075347 A1 | 4/2006 | Rehm .......................... 715/727 |
| 2006/0095452 A1 | 5/2006 | Jansson et al. .............. 707/101 |
| 2006/0139709 A1* | 6/2006 | Bifano et al. ................ 358/527 |
| 2006/0150109 A1 | 7/2006 | Schultz et al. ............... 715/759 |
| 2006/0195461 A1 | 8/2006 | Lo et al. ...................... 707/100 |
| 2007/0022372 A1 | 1/2007 | Liu et al. ..................... 715/201 |
| 2007/0124325 A1 | 5/2007 | Moore et al. ................ 707/102 |
| 2007/0156627 A1 | 7/2007 | D'Alicandro .................. 707/1 |
| 2007/0156643 A1 | 7/2007 | Sareen et al. ................... 707/2 |
| 2007/0168278 A1 | 7/2007 | Peterson et al. ............... 705/38 |
| 2007/0245223 A1 | 10/2007 | Siedzik et al. .............. 715/203 |
| 2007/0245229 A1 | 10/2007 | Siedzik et al. .............. 715/205 |
| 2008/0115048 A1 | 5/2008 | Veselova et al. ............. 715/205 |
| 2008/0115069 A1 | 5/2008 | Veselova ..................... 715/760 |

FOREIGN PATENT DOCUMENTS

| | | |
|---|---|---|
| EP | 0986011 A2 | 3/2000 |
| EP | 1223503 A2 | 7/2002 |
| EP | 1376337 A1 | 2/2004 |
| EP | 1630694 A2 | 3/2006 |
| GB | 2391148 A | 1/2004 |
| JP | 2001265753 A | 9/2001 |
| WO | WO9800787 A1 | 8/1998 |
| WO | WO2004038548 A2 | 5/2004 |
| WO | WO2004038548 A3 | 5/2004 |
| WO | WO2004038548 R4 | 5/2004 |
| WO | WO 2004086254 A1 | 10/2004 |
| WO | WO 2005001709 A2 | 1/2005 |
| WO | WO 02005067328 A1 | 7/2005 |
| WO | WO2005110010 A2 | 11/2005 |
| WO | WO 2007081783 A2 | 7/2007 |
| WO | WO 2007081783 A3 | 7/2007 |
| WO | WO 2007081786 A2 | 7/2007 |
| WO | WO 2007081786 A3 | 7/2007 |

OTHER PUBLICATIONS

"Setting Reminders in Outlook", California Lutheran University Information Systems and Services, Nov. 2005, 3 pp.

U.S. Appl. No. 10/420,621, filed Apr. 22, 2003, entitled "Creation and Recognition of Specially-Marked Items in Notes".

U.S. Appl. No. 10/387,287, filed Mar. 12, 2003, entitled "System and Method for Customizing Note Flags".

U.S. Appl. No. 10/397,103, filed Mar. 26, 2003, entitled "System and Method for Linking Page Content with a Media File and Displaying the Links".

U.S. Official Action mailed Oct. 19, 2004 in U.S. Appl. No. 10/397,103.

U.S. Official Action mailed Sep. 23, 2005 in U.S. Appl. No. 10/420,621.

U.S. Official Action mailed Mar. 6, 2006 in U.S. Appl. No. 10/664,740.

U.S. Official Action mailed Jun. 12, 2006 in U.S. Appl. No. 10/387,287.

U.S. Official Action mailed Jun. 13, 2006 in U.S. Appl. No. 10/420,621.

U.S. Official Action mailed Feb. 7, 2007 in U.S. Appl. No. 10/387,287.

U.S. Official Action mailed Feb. 20, 2007 in U.S. Appl. No. 10/420,621.

U.S. Official Action mailed Apr. 19, 2007 in U.S. Appl. No. 10/397,103.

U.S. Official Action mailed Jul. 13, 2007 in U.S. Appl. No. 10/664,740.

U.S. Official Action mailed Jul. 16, 2007 in U.S. Appl. No. 11/063,309.

U.S. Official Action mailed Oct. 19, 2007 in U.S. Appl. No. 10/387,287.

U.S. Official Action mailed Nov. 5, 2007 in U.S. Appl. No. 10/420,621.

U.S. Official Action mailed Jan. 7, 2008 in U.S. Appl. No. 10/397,103.

U.S. Official Action mailed Jan. 7, 2008 in U.S. Appl. No. 11/063,309.

U.S. Official Action mailed Mar. 10, 2008 in U.S. Appl. No. 10/955,232.

U.S. Official Action mailed May 12, 2008 in U.S. Appl. No. 10/397,103.

U.S. Official Action mailed Feb. 21, 2008 in U.S. Appl. No. 11/326,110.

Microsoft Corporation, "Microsoft Snipping Tool for Tablet PC Preview Release Help: Capturing Clips; Capturing Regions; Displaying or Hiding Links", Nov. 2002, 4 pp.
Leszynski Group, "News Story: Leszynski Group Powers Bill Gates' Tablet PC Launch Keynote", Nov. 2002, 1 pp.
Leszynski Group, "Tablet PC Solutions", Nov. 2002, 3 pp.
IBM Corporation, "Dragging Marked Data to an Editor Window", Technical Disclosure Bulletin, Mar. 1992, vol. 34, No. 10B, pp. 202-203.
IBM Corporation, "Source Dimension Copying Using the Standard Clipboard", Technical Disclosure Bulletin, Aug. 1994, vol. 37, No. 8, pp. 419-420.
IBM Corporation, "Multiple Item On-Line Clipboard", Technical Disclosure Bulletin, Jul. 1992, No. 2, pp. 425.
Apperley, M. et al., "Breaking the Copy/Paste Cycle: The Stretchable Selection Tool", Computer Science Department, New Zealand, Feb. 2000, pp. 1-8.
Rich, Charles and Sidner, Candace L., "Segmented Interaction History in a Collaborative Interface Agent," 1997 ACM, pp. 23-30.
Dwelly, Andrew, "Functions and Dynamic User Interfaces," 1989 ACM, pp. 371-381.
Kurtenbach, Gordon et al., "The Hotbox: Efficient Access to a Large Number of Menu-items," ACM 1999, pp. 231-237.
Rich, Charles and Sidner, Candace L., "Adding a Collaborative Agent to Graphical User Interfaces," 1996 ACM, pp. 21-30.
Boyce, Jim, "Microsoft Outlook Inside Out," 2001, Redmond, Washington, pp. 67, 68, 109, 110, 230, 231, 310, 316-318, 798.
Halvorson, Michael and Young, Michael, "Microsoft Office XP Inside Out," 2001, Redmond, Washington, pp. 1005-1009, 1015, 1023-1028, 1036-1039, 1093.
Riggsby, Matt et al., "Mastering Lotus Notes and Domino 6," 2003, Alameda, California, pp. 135-139.
Riggsby, Matt, et al., "Mastering Lotus Notes and Domino 6," 2003, Alameda, California, pp. 135-138, 607-612.
"Primary Windows," http://www-03.ibm.com/servers/eserver/iseries/navigator/guidelines/primary.html, date unknown (printed Feb. 23, 2007, 23 pages.
Schumaker, Dennis, "User Interface Standards," http://msdn2.microsoftt.com/en-us/library/aa217660(office.11,d=printer).aspx, Sep. 2001, 5 pages.
Budinsky, F. et al., "WebSphere Studio Overview," http://researchweb.watson.ibm.com/journal/sj/432/budinsky.html, May 6, 2004, 25 pages.
Padwick, Gordon, Ebook titled "Special Edition Using Microsoft Outlook 2002", published May 17, 2001, pp. 1-7.
"Evermore Integrated Office if the 'First Real Office'", Evermore Software Ltd., 2001-2004, retrieved Jan. 24, 2007, http://web.archive.org/web/20040106195344/www.evermoresw.com/weben/product/eio_...., 2 pp.
Young et al., "Microsoft Office System Inside Out: 2003 Edition", published Sep. 10, 2003, pp. 1-168.
Slovak, Ken, "Absolute Beginner's Guide to Microsoft Office Outlook 2003", Que, Oct. 1, 2003; Chapter 1: Personal Information Management, Chapter 2: Working in Outlook's User Interface, Chapter 4: Flagging E-Mails and E-Mail Reminders, Chapter 7, Chapter 12: Using Advanced Find, 6 pp.
Braun, Owen, "Owen Braun: OneNote 12: Linking related notes together (really)", Date: Oct. 6, 2005, http://blogs.msdn.com/owen_braun/archive/2005/10/06/477615.aspx, 6 pp.
Braun, Owen, "Owen Braun: OneNote 12: Linking related notes together", Date: Oct. 6, 2005, http://blogs.msdn.com/owen_braurn/archive/2005/10/06/477610.aspx, 2 pp.
Braun, Owen, "Owen Braun: OneNote 12: New Extensibility in OneNote 12", Date: Oct. 6, 2005, http://blogs.msdn.com/owen_braun/archive/2005/12/15/503879.aspx, 2 pp.
"SOHO Notes Tour: Note-Taking", http://www.chronosnet.com/Products/sohonotes/sn_notetaking.html, Date Unknown, 3 pp.
Henzinger, Monica, "Link Analysis in Web Information Retrieval", Date: 2000, http://www.acm.org/sigs/sigmod/disc/disc01/out/websites/deb_september/henzinge.pdf, 6 pp.
"Accessibility Essentials 2 Authoring Accessible Documents—Inserting Hyperlinks: Linking internally within a document", http://www.techdis.ac.uk/resources/sites/accessibilityessentials2/modules/authoring%20accessible%20docs/hyperlink%20internally.html, Date Unknown, 4 pp.
"Tomboy: Simple Note Taking", Date: 2004-2006, http://www.beatniksoftware.com/tomboy/, 4 pp.
Kraynak, Joe, "Absolute Beginner's Guide to Microsoft Office Excel 2003," Que, Sep. 2003, 14 pp.
Baker, Richard, "Microsoft Office 2004 for Mac in a Snap," Sams, Aug. 2004, 17 pp.
U.S. Official Action mailed Jul. 9, 2008 cited in U.S. Appl. No. 10/387,287.
U.S. Official Action mailed Nov. 12, 2008 cited in U.S. Appl. No. 10/955,232.
U.S. Official Action mailed Nov. 17, 2008 cited in U.S. Appl. No. 11/326,110.
U.S. Official Action mailed Dec. 24, 2008 cited in U.S. Appl. No. 10/420,621.
PCT Search Report mailed Jun. 22, 2007 in PCT/US2007/000248.
PCT Search Report mailed Jun. 22, 2007 in PCT/US2007/000244.
Chinese First Office Action mailed Oct. 31, 2008 in 200510088531.1.
European Search Report mailed Jan. 30, 2009 in 07717882.0-1527/1977340.
European Search Report mailed Jan. 30, 2009 in 07717837.4-1527/1977339.
"Microsoft Office 2003 Editions Product Guide", Internet Publication, Sep. 2003, 168 pp.
U.S. Official Action mailed Mar. 13, 2009, in U.S. Appl. No. 10/955,232.
U.S. Official Action mailed Mar. 18, 2009, in U.S. Appl. No. 10/387,287.
U.S. Official Action mailed Jun. 18, 2007 in U.S. Appl. No. 10/954,954.
U.S. Official Action mailed Mar. 18, 2008 in U.S. Appl. No. 10/954,954.
U.S. Official Action mailed Oct. 28, 2008 in U.S. Appl. No. 10/954,954.
U.S. Official Action mailed Dec. 11, 2008 in U.S. Appl. No. 11/405,251.
U.S. Official Action mailed May 20, 2009 in U.S. Appl. No. 11/599,598.
U.S. Official Action mailed Jun. 11, 2009 in U.S. Appl. No. 11/599,626.
U.S. Official Action mailed Jun. 11, 2009 in U.S. Appl. No. 11/405,256.
U.S. Official Action mailed Jun. 15, 2009 in U.S. Appl. No. 10/420,621.
U.S. Official Action mailed Jul. 17, 2009 in U.S. Appl. No. 11/405,251.
U.S. Official Action mailed Aug. 7, 2009 in U.S. Appl. No. 11/326,110.
PCT Search Report dated Jun. 22, 2007 in PCT/US2007/000248.
PCT Search Report dated Jun. 22, 2007 in PCT/US2007/000244.
Chinese First Office Action dated Oct. 31, 2008 in 200510088531.1.
European Search Report dated Jan. 30, 2009 in 07717882.0-1527/1977340.
European Search Report dated Jan. 30, 2009 in 07717837.4-1527/1977339.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
"The Style Element & CSS Selectors", http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
"ID & Class Selectors, Pseudoclasses", http://www.webreference.com/html/tutorial5/7.html, Aug. 20, 1998, 3 pgs.

"ID & Class Selectors, Pseudoclasses", http://www.webreference.com/html/tutorial5/8.html, Aug. 20, 1998, 2 pgs.
"External Style Sheets," http://www.webreference.com/html/tutorial5/10.html, Aug. 20, 1998, 3 pgs.
Raman, "Cascaded Speech Style Sheets," 1997, 7 pgs.
Hopkins, "The Design and Implementation of Pie Menu", Originally published in Dr. Dobb's Journal, 1991, pp. 1-7.
Lewis, "Easy Microsoft Office 2003", Sep. 2003, 10 pp.
Microsoft Press, "Microsoft Windows User Experience", 1999, pp. 51-52.
Long, Jr., et al., "A Prototype User Interface For A Mobile Multimedia Terminal," Department of Electrical Engineering and Computer Sciences, The University of California at Berkeley, Berkeley, CA. http://sigchi.org/chi95/Electronic/documents/intex:/acl_bdy.htm, retrieved Jan. 10, 2006, 4 pp.
Landay, et al., "NotePals: Sharing and Synchronizing Handwritten Notes with Multimedia Documents," EECS Department, University of California, Berkeley, CA http://www.cs.berkeley.edu/~landay/research/publications/hcscw/HCSCW-NotePals.html, retrieved Jan. 10, 2006, 8 pp.
Singh, et al., "Collaborative Note Taking Using PDAs" Department of Computer Science, Naval Postgraduate School, Monterey, CA—http://www.fxpal.com/people/denoue/publications/jise_2005.pdf, 2005, pp. 835-848.
Weverka, Microsoft Office OneNote 2003, Step by Step, http://proquest.safaribooksonline.com/0735621098, Microsoft Press, Jul. 13, 2004, pp. 1-64.
Harter, et al., A Distributed Location System for the Active Office, IEEE Network, 1994, pp. 62-70.
Chen, et al., A Survey of Context-Aware Mobile Computing Research, Dartmouth Computer Science Technical Report, 2000, 16 pages.
Schilit, A System Architecture for Context-Aware Mobile Computing, Columbia University, 1995, 153 pages.
Spreitzer, et al., Providing Location Information in a Ubiquitous Computing Environment, SIGOPS '93, 1993, pp. 270-283.
Theimer, et al., Operating System Issues for PDAs, In Fourth Workshop on Workstation Operating Systems, 1993, 7 pages.
Want, Active Badges and Personal Interactive Computing Objects, IEEE Transactions on Consumer Electronics, 1992, 11 pages, vol. 38-No. 1.
Schilit, et al., The ParcTab Mobile Computing System, IEEE WWOS-IV, 1993, 4 pages.
Schilit, et al., Context-Aware Computing Applications, In Proceedings of the Workshop on Mobile Computing Systems and Applications, Dec. 1994. pp. 85-90.
Schilit, et al., Customizing Mobile Applications, Proceedings USENIX Symposium on Mobile and Location Independent Computing, Aug. 1993, 9 pages.
Spreitzer, et al., Architectural Considerations for Scalable, Secure, Mobile Computing with Location Information, In The 14th International Conference on Distributed Computing Systems, Jun. 1994, pp. 29-38.
Spreitzer et al., Scalable, Secure, Mobile Computing with Location Information, Communications of the ACM, Jul. 1993, 1 page, vol. 36-No. 7.
Want, et al., The Active Badge Location System, ACM Transactions on Information Systems, Jan. 1992, pp. 91-102, vol. 10-No. 1.
Weiser, Some Computer Science Issues in Ubiquitous Computing, Communications of the ACM, Jul. 1993, pp. 75-84, vol. 36-No. 7.
Billinghurst, et al., An Evaluation of Wearable Information Spaces, Proceedings of the Virtual Reality Annual International Symposium, 1998, 8 pages.
Rhodes, Remembrance Agent: A continuously running automated information retrieval system, The Proceedings of The First International Conference on The Practical Application Of Intelligent Agents and Multi Agent Technology, 1996, pp. 487-495.
Horvitz, et al., In Pursuit of Effective Handsfree Decision Support: Coupling Bayesian Inference, Speech Understanding, and User Models, 1995, 8 pages.
Rhodes, The Wearable Remembrance Agent: A System for Augmented Theory, The Proceedings of The First International Symposium on Wearable Computers, Oct. 1997, pp. 123-128.
Horvitz, et al., Attention-Sensitive Alerting in Computing Systems, Microsoft Research, Aug. 1999.
Schilit, et al., Disseminationg Active Map Information to Mobile Hosts, IEEE Network, 1994, pp. 22-32, vol. 8-No. 5.
Billinghurst, et al., Wearable Devices: New Ways to Manage Information, IEEE Computer Society, Jan. 1999, pp. 57-64.
Starner, Wearable Computing and Contextual Awareness, Massachusetts Institute of Technology, Jun. 1999, 248 pages.
Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Billinghurst, Research Directions in Wearable Computing, University of Washington, May, 1998, 48 pages.
Weiser, The Computer for the 21st Century, Scientific American, Sep. 1991, 8 pages.
Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Losee, Jr., Minimizing information overload: the ranking of electronic messages, Journal of Information Science 15, Elsevier Science Publishers B.V., 1989, pp. 179-189.
"Setting Reminders in Outlook", California Lutheran University Information Systems and Services, Nov. 2005, 3 pp.
PCT Search Report dated Aug. 27, 2007 in PCT/US2007/007233.
PCT Search Report dated Sep. 21, 2007 in PCT/US2007/007231.
Mexican Official Action dated Feb. 20, 2009 in PA/a/2005/007147—English Translation Only.
European Examination Report dated Mar. 25, 2009 in 07717882.0-1527/1977340.
European Examination Report dated Apr. 1, 2009 in 07717837.4-1527/1977339.
Russian Office Action dated Jun. 15, 2009 in 2005120371.
Chinese Second Office Action dated Jul. 10, 2009 in 200510088531.1.
European Examination Report dated Oct. 6, 2009 in 07717882.0-1527.
European Examination Report dated Oct. 6, 2009 in 07717837.4-1527.
Kamel et al., "Retrieving Electronic Ink by Content", Multimedia Database Management Systems, 1996., Proceedings of International Workshop on Aug. 14-16, 1996 pp. 54-61.
U.S. Official Action mailed Oct. 14, 2009 in U.S. Appl. No. 10/955,232.
U.S. Official Action mailed Oct. 19, 2009 in U.S. Appl. No. 11/599,598.
Chinese First Office Action dated Oct. 30, 2009 in 200780001988.1.
U.S. Official Action mailed Oct. 24, 2006 in U.S. Appl. No. 10/664,740.
U.S. Official Action mailed Dec. 23, 2009 in U.S. Appl. No. 11/405,251.
Chinese First Office Action dated Dec. 18, 2009 in 200780001911.4.

* cited by examiner

APPLICATION OF METADATA TO DOCUMENTS AND DOCUMENT OBJECTS VIA AN OPERATING SYSTEM USER INTERFACE

BACKGROUND

With the advent of the computer age, computer and software users have grown accustomed to receiving, retrieving, generating and storing vast amounts of data in the form of a variety of electronic documents and document objects. For example, users commonly store word processing documents, slide presentation documents, spreadsheet documents, database files, calendaring and contacts files, and the like, in local and remote file storage systems. A significant problem arises, however, when a user needs to find a particular document or document object (portion of a document) among hundreds or even thousands of documents or document objects.

Search mechanisms are available for searching across a general file system for a given text string or other identifying data, but such mechanisms often take a great deal of time, and the results may not be satisfactory, particularly, where a user is looking for a particular data object, such as a chart or a picture located in a given document. Systems also have been developed for applying a piece of metadata to a given document or document object, for example, a colored flag, for assisting the user in subsequently locating the marked item. However, such systems do not allow for a standard marking or flagging of associated items across a file system having documents and document objects generated and/or stored via a variety of different software applications, for example, word processors, spreadsheet applications, slide presentation applications, calendaring applications, and the like. Moreover, such systems do not provide a summary view of all flagged items across a general file system and across multiple application types. The result causes users to maintain separate management techniques and mechanisms for each set of marked or flagged items under each application file type.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing methods, systems and computer products for applying metadata (flags) to documents and/or document objects so that flagged documents or document objects of a variety of file types may be associated with other documents and/or document objects, and so that flagged items may be easily located and utilized across a local or remote file storage system and across disparate software applications.

According to embodiments of the invention, a mechanism is provided for applying metadata to documents or document objects across a local or remote file system regardless of file type. Thus, a given flag, for example, a colored icon, may be applied to a number of different documents, for example, word processing documents, spreadsheet documents, slide presentation documents, calendar/contacts data, or particular data objects embedded in such documents or data, for identifying the flagged items according to a significance placed on the flagged items by the user. For example, a user may apply a flag to all documents or document objects having data associated with a particular work project. For another example, a user may apply a flag to all documents or document objects requiring attention of the user on a particular date. Items may be flagged according to a variety of criteria, for example, "To Do" items, "Important" items, "Questions," and the like. Flags applied to documents or document objects may be modified or cleared altogether.

If a user desires to browse all documents or document objects flagged with a particular metadata, for example, all documents or document objects flagged with a red flag associated with a particular work project, a flag summary may be launched, and all documents and/or document objects may be sorted on a particular flag for surfacing all documents or document objects associated with the example particular work project. Alternatively, flagged items may be surfaced through an information pane associated with a launched or otherwise selected flagged item. If a given flagged document or document object is in use, an information pane may be provided in which a listing of all other documents or document objects contained in a given file system and bearing the same flag is presented. Thus, the user may conveniently review related documents or document objects without the need for additional searching.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems and computer products for applying metadata to documents and/or document objects in local and/or remote file storage systems. Application of metadata (flags) to documents and/or document objects allows a user to easily locate and utilize flagged items. A single metadata type, such as a colored flag, may be applied to documents or document objects of different file types across a file storage system to which data is stored via different software applications. Documents and/or document objects bearing like flags may be surfaced to a user in a flag summary with which documents and/or document objects may be sorted by flag type. Flagged documents or document objects related to a launched document may be listed in an information pane adjacent to the launched document.

In the following detailed description, references are made to the accompanying drawings that form a part hereof and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
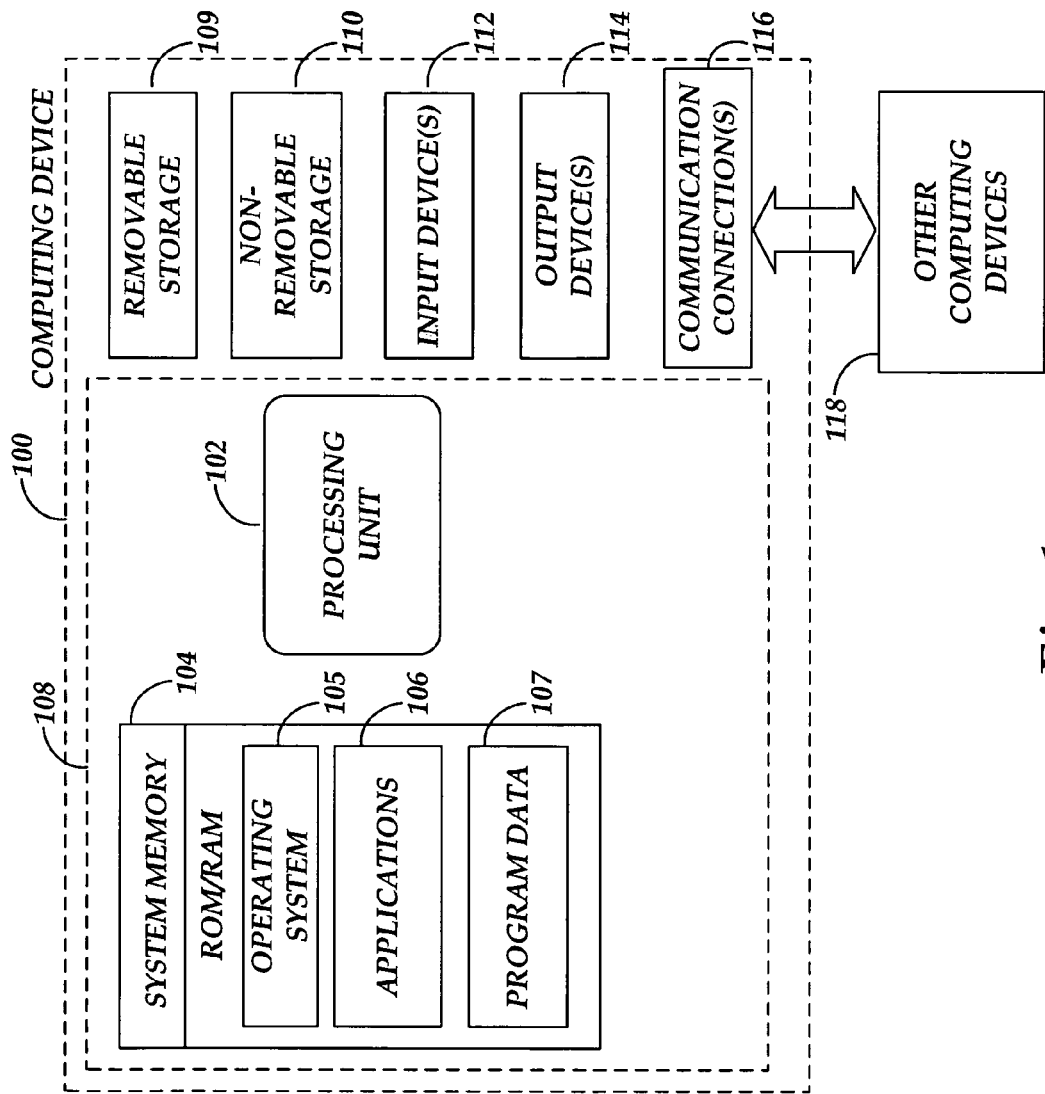
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as an electronic mail program, a calendaring program, an Internet browsing program, and the like. An example of such programs is OUTLOOK® manufactured by MICROSOFT CORPORATION. The application 106 may include a number of other types software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
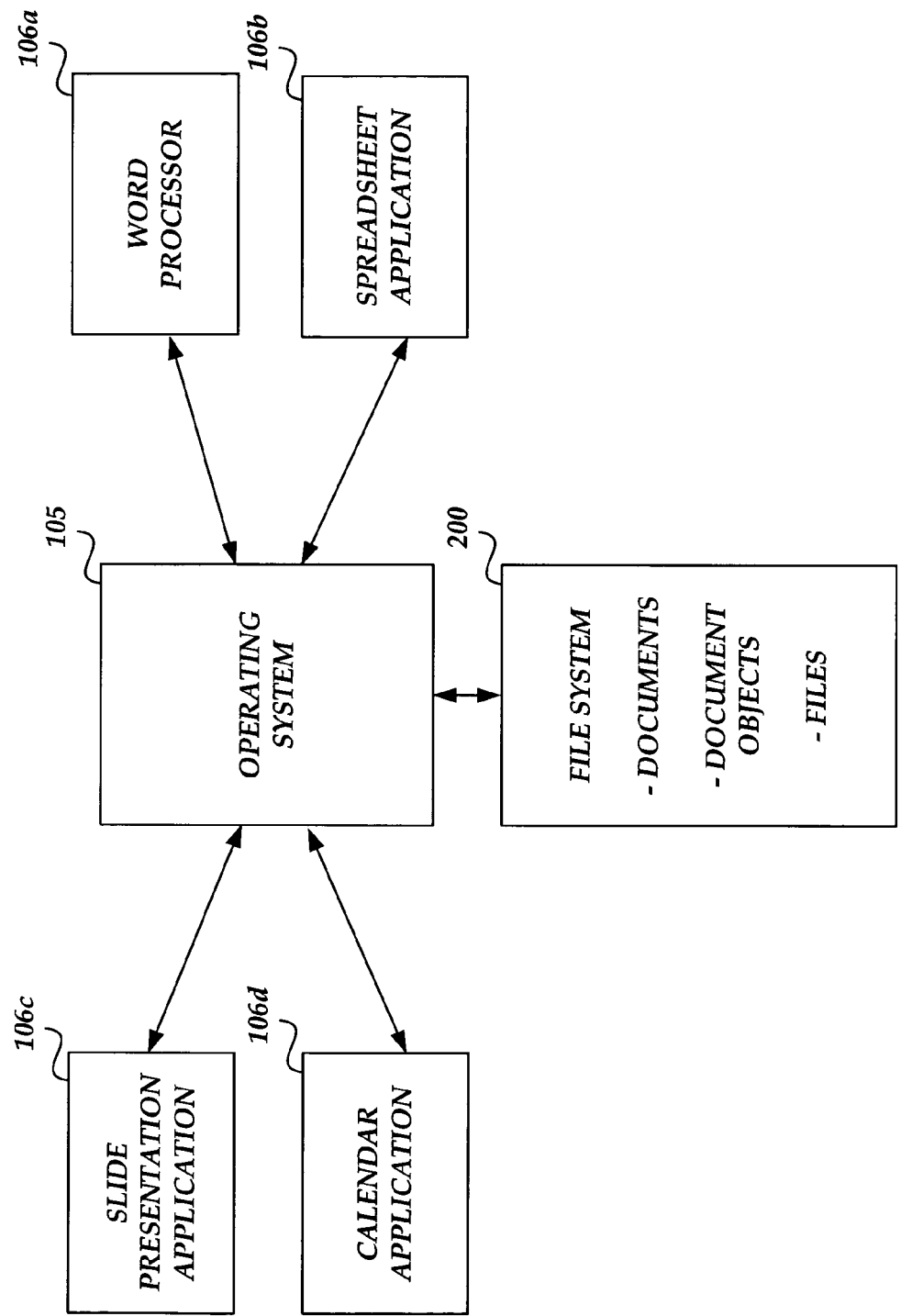
FIG. 2 is a simplified block diagram illustrating interaction between a computer operating system, one or more software applications and a local and/or remote file storage system.

FIG. 2 is a simplified block diagram illustrating interaction between a computer operating system, one or more software applications and a local and/or remote file storage system in which documents, document objects and a variety of other electronic files may be stored. According to embodiments of the present invention, electronic documents and/or document objects may be flagged with metadata for subsequently locating and utilizing flagged items via a variety of software applications, such as the word processing application 106a, the spreadsheet application 106b, the slide presentation application 106c, the calendar application 106d, and the operating system 105. As appreciated by those skilled in the art, each of the disparate software applications 106a-106d typically provide a user interface through which documents generated and/or stored via a given application may be accessed, launched and manipulated. Similarly, the operating system 105 typically provides a user interface (also known as a shell) for providing general functionality of the operating system and for providing a graphical representation of electronic buttons and controls for accessing functionality of the operating system and one or more associated software applications 106a-106d, as well as, for providing graphical icons for selecting electronic files, documents and/or document objects maintained in the file storage system 200.

As should be appreciated by those skilled in the art, electronic documents and/or document objects (for example, embedded document charts, pictures, tables, text strings, numeric data, etc.) may be stored in a local or remote general file storage system 200 to which access to stored documents, document objects or other electronic files may be obtained via the applications 106a-106d and via the operating system 105. The file storage system 200 is illustrative of a local file storage system co-located with the operating system 105, and the file system 200 is illustrative of a file storage system located remotely from the operating system 105 and accessible to the operating system 105 and the associated software applications 106a-106d via a distributed computing environment, such as an intranet or the Internet. An exemplary file storage system 200 includes the WINDOWS® File System (WinFS) from MICROSOFT CORPORATION. Those skilled in the art are familiar with such general file storage systems as databases in which word processing documents, spreadsheet documents, slide presentation documents, calendaring files, including contacts, tasks, to-do lists, calendar items, etc., are stored by one or more software applications operating via an operating system 105.

As briefly described above, according to prior methods and systems, a user desiring to locate a particular document and/or document object maintained in the file storage system 200 may initiate a search for a desired document and/or document object via a search mechanism of the operating system 105, or via a search mechanism operated by one of the individual software applications 106a-106d. However, such a search via the operating system 105 may take an excessive amount of time, and such a search operated from an individual software application 106a-106d may only provide results of the file type associated with the searching software application. According to embodiments of the present invention, a standardized mechanism is provided for applying metadata to a document and/or document object in the form of a flag via the operating system 105 or via disparate software applications 106a-106d such that flagged items may be located in the file storage system 200 via the operating system 105 or via any of the disparate software applications 106a-106d regardless of file type of stored flagged items. As should be appreciated, the illustration and description of applications 106a-106d throughout this document are for purposes of example and are not limiting of other types of software applications for which embodiments of the present invention may be utilized. For example, embodiments of the present invention may be utilized in connection with computer-aided design and drawing applications, notes taking applications, audio/visual applications, database applications, desktop publishing applications, and the like.

According to embodiments of the present invention, metadata applied to a document and/or document object, referred to herein as a "flag," is defined as a general file storage system 200 item that contains a label (for example, a text string), as well as, a visual overlay (for example, an icon and/or highlight color). According to embodiments, the flag may maintain a reference relationship with other items (documents, document objects, or other flags) stored in the file storage system 200 to facilitate easy retrieval of a given flag, flagged item, or associated flag or flagged item. As will be described below, a flag applied to a given document and/or document object may be a piece of metadata with which a given document and/or document object is decorated, for example, a colored icon, for quickly distinguishing the associated flagged item as bearing some type of significance to the user. On the other hand, flags applied to documents and/or document objects may be "specialty" flags that carry programmatic actions that may execute specific behaviors, for example, a "Task" flag may create a task in an associated calendar application. Other specialty flags may highlight portions of text or provide text-based commentary to flagged items.

According to embodiments of the present invention, flags applied to documents and/or document objects may be utilized for building a relationship between similarly flagged documents and/or document objects. For example, a "reminder" flag may be applied to all documents and/or document objects across a variety of disparate application file types for which a user desires to be reminded of one or more actions, events, or tasks. For another example, a "research" flag may be applied to all documents and/or document objects associated with a particular research project being conducted by a given user. As described herein, by applying a given flag type, for example, a "research" flag, to a number of different documents and/or document objects, a user may subsequently locate, retrieve, and utilize all like flagged items across disparate application types without the need for individually searching different application types via disparate software applications 106a-106d, or without being required to conduct an exhaustive general file storage system search via an operating system 105.

Figure 3:
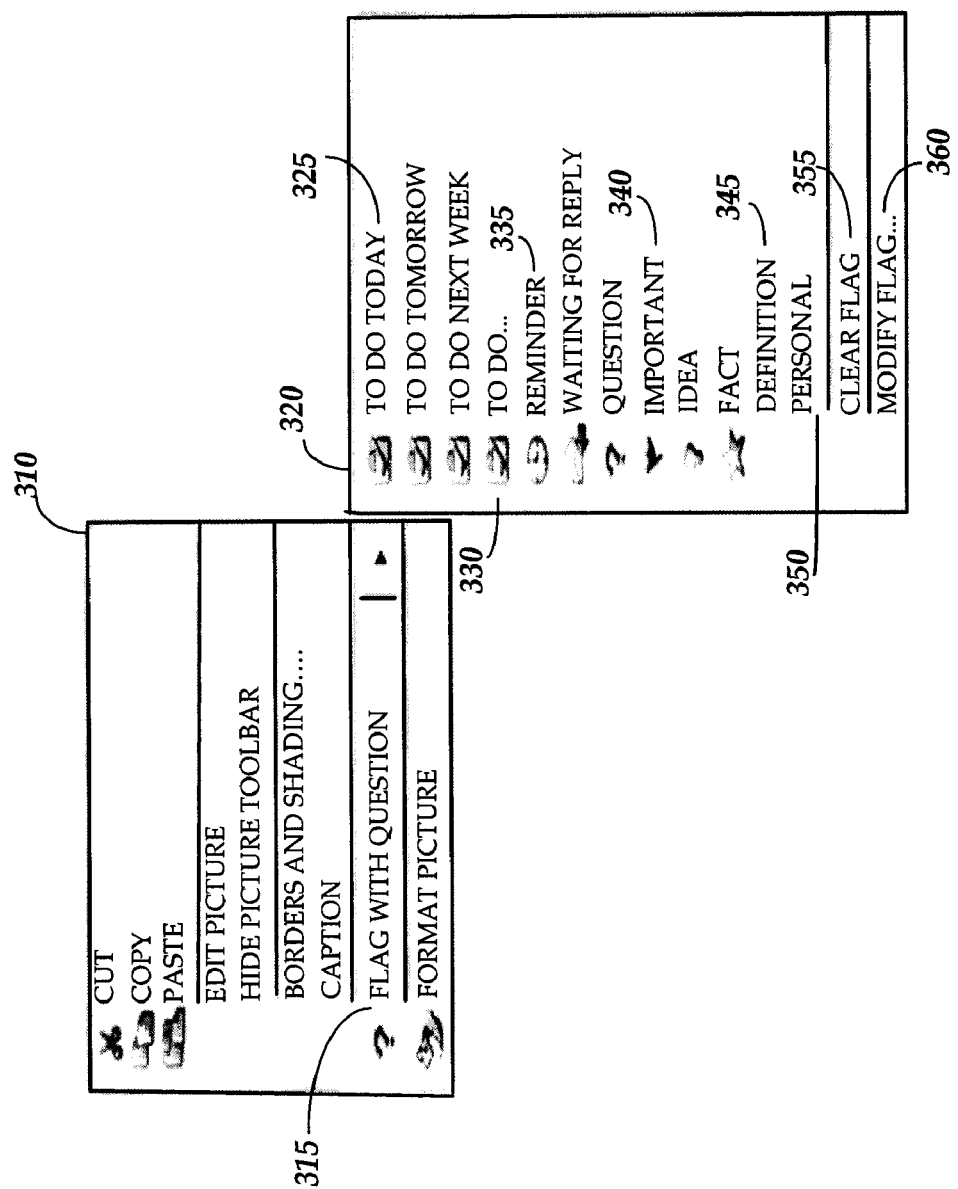
FIG. 3 illustrates a computer screen display showing a dropdown menu for applying different types of metadata (flags) to a selected document or document object.

FIG. 3 illustrates a computer screen display showing a dropdown menu for applying one of a number of different types of metadata (flags) to a selected document or document object. According to embodiments of the present invention, an individual document and/or document object may be flagged with metadata, as described herein, by selecting a desired document from a document list via the operating system 105 or via one of the disparate software applications 106a-106d followed by the application of a desired flag type to the selected document. A flag may be applied to a particular document object in a particular document by selecting the document object, for example, a text selection, chart object, picture object, table object, and the like, followed by application of the a desired flag type to selected embedded document object.

Referring to FIG. 3, upon selection of a document or document object for application of a desired flag, a flag library menu 320 may be deployed for selectively applying one of a number of different flag types to the selected document or document object. According to embodiments of the invention, a flag may be applied to any document or document object contained in a selected local file storage system 200 or any remote file storage system accessible via a distributed computing environment. The menu 320 is shown as a fly-out menu deployed adjacent to a dropdown menu 310 upon the selection of a flag control 315 contained in the dropdown menu 310. That is, according to the illustrated menus shown in FIG. 3, upon selection of a given document or document object via a user interface operated by the operating system 105 or one of the applications 106a-106d, the dropdown menu 310 may be deployed under a listing of operating system or application functionalities, for example, a toolbar, and the fly-out menu 320 may be deployed for presenting one or more flag types that may be applied to the selected document or document object. As should be appreciated, the file library menu 320, illustrated in FIG. 3, is for purposes of example only and is not limiting of the different layouts and presentations of flag types that may be applied to documents and/or document objects according to embodiments of the present invention. For example, the flag library 320 may be presented in a different type of menu or in different locations or orientations relative to a selected document or document object.

As shown in the flag library menu 320, a collection of flag items is presented from which a desired flag type may be selected for applying to a selected document and/or document object. According to one embodiment, a default set of flags may be provided according to the programming of an associated software application 106a-106d or the associated operating system 105. As should be appreciated, the listing of flag types illustrated in FIG. 3 is for purposes of example only and is not limiting of the vast numbers of different flag types that may be created and utilized according to embodiments of the present invention. According to one embodiment, new flag types may be generated by user action, and new flag types may be added to the flag library 320 via third-party software application add-ins. Moreover, each of the disparate software applications 106a-106d may contain different flag types, and each of the disparate software applications 106a-106d may expose their flag types to the operating system 105 and to other software applications 106a-106d for allowing documents and/or document objects flagged via any one of the software applications 106a-106d or the operating system 105 to be located and utilized by other applications 106a-106d or by the operating system 105.

Referring still to the flag library 320, a "To Do Today" flag 325 is provided for flagging one or more documents and/or document objects with metadata indicating that the flagged item is associated with a task that needs to be done today. A general "To Do" flag 330 is provided for marking documents and/or document objects as being associated with information or tasks that require some sort of attention. A "Reminder" flag 335 may be applied to documents and/or document objects for reminding a user to review or otherwise utilize the flagged item. An "Important" flag 340 may be utilized for subsequently indicating to a flagging user that the flagged item is important. Other flag types illustrated in the flag library 320 include the "Waiting For Reply" flag, which may be used to indicate that a flagging user is anticipating a reply from another user about some aspect of the flagged item. A "Question" flag may be utilized for flagging one or more documents and/or document objects as having some aspect about which the flagging user has a question. Other flags, not illustrated in FIG. 3, include a "Research" flag that may be utilized for flagging one or more documents and/or document objects as being associated with a given research study or project. The "Definition" flag 345 and the "Personal" flag 350 allow for the highlighting or other annotation of a given document and/or document object for subsequent location and utilization by a given user. A "Clear Flag" control 355 is provided for clearing one or more flags applied to one or more documents and/or document objects. A "Modify Flags" control 360 is provided for modifying or otherwise customizing a flag applied to one or more documents and/or document objects, as described below with reference to FIG. 4.

As described above, flagging documents and/or document objects, as described herein, allows a given user to categorize certain documents and/or document objects as being related to each other according to a given flag type so that the user may subsequently locate any and all similarly flagged items for desired utilization. For example, a user may apply the "To Do Today" flag 325 to a number of different documents and/or document objects across a general file storage system 200, generated with one or more different software applications 106a-106d, that are associated with tasks or events that are important to the user on today's date. As will be described below, once one or more documents and/or document objects are flagged, for example, using the "To Do Today" flag, each of the like flagged items becomes related by virtue of being flagged with the same flag type. Thus, when a user subsequently desires to review and/or otherwise utilize any of the like flagged items, the user may search the file storage system 200 for items flagged with the same flag type for obtaining all documents and/or document objects flagged with that particular flag.

Figure 4:
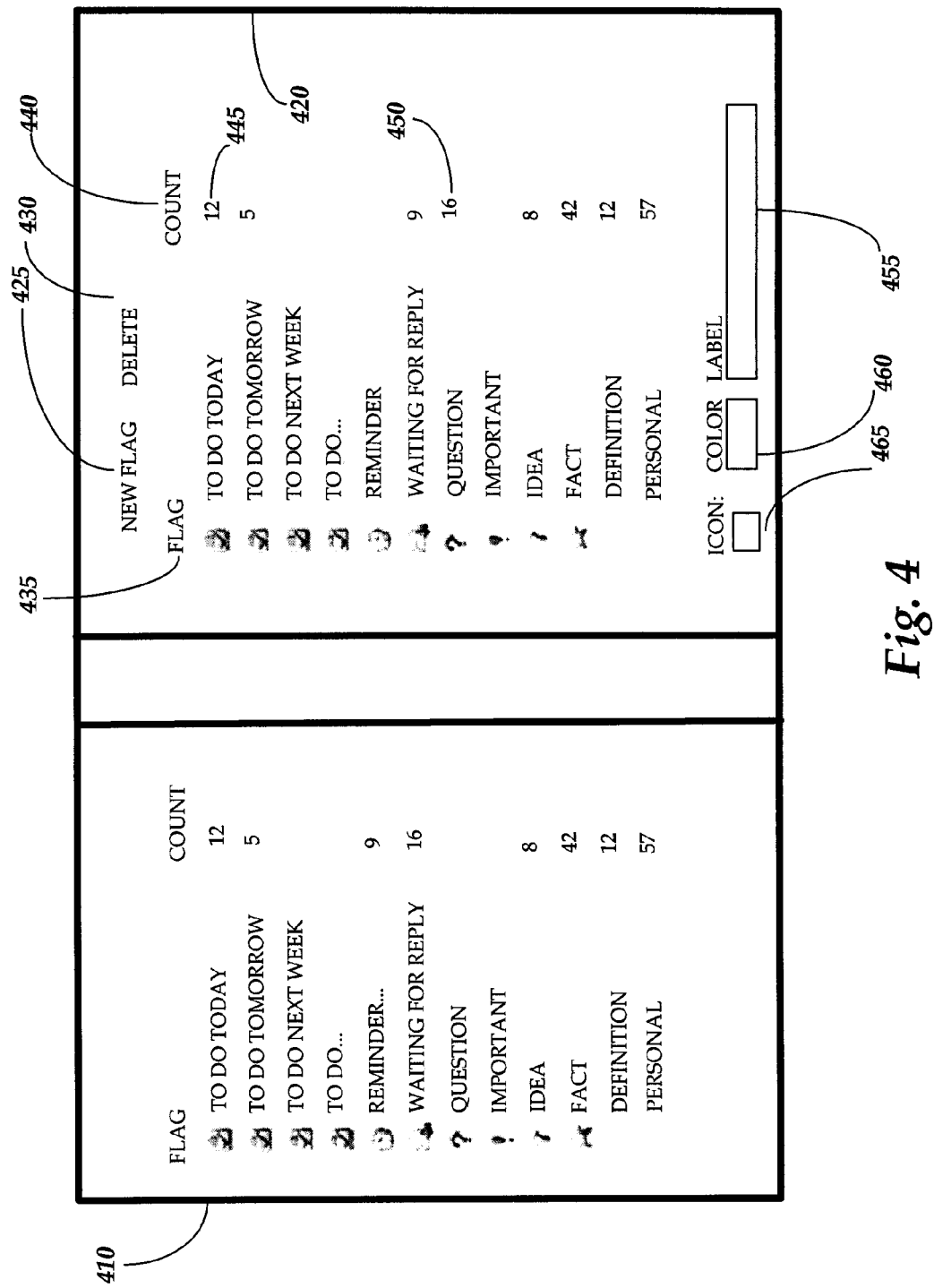
FIG. 4 illustrates a computer screen display of a menu or dialog for modifying one or more previously applied flags.

According to embodiments, new flags may be created, and flags currently applied to one or more documents and/or document objects may be customized or modified after application. Referring to FIG. 4, if the "Modify flags" control 360 is selected, a "Modify Flags" dialog 410, 420 is provided to allow creation of new flags and modification or deletion of existing flags. As should be appreciated, the dialog 410, 420 is illustrated for purposes of example only and is not limiting of the different layouts and presentations that may be used to provide flag modification functionality. According to embodiments of the invention, the "Modify Flags" dialog may be launched for a selected file storage system 200, and all flag types 435 for the selected file storage system will be presented along with a listing of the number of documents 445 or document objects in the selected file storage system that are flagged with each flag type. Thus, a user may quickly see the number of flagged items that will be affected if a given flag is modified or deleted. For example, referring to FIG. 4, for the flag type 435 "To Do Today," twelve items are shown under the "Count" column 440. Thus, if the user modifies the "To Do Today" flag, twelve items in the selected file storage system will be affected.

Referring still to FIG. 4, a given flag may be modified in a number of ways. An icon selector 465 may be used to change the visual icon for the flag, for example, question mark icon, research icon, idea icon, and the like, to a different available icon. If such a change is made to one flagged item of a group of related flagged items, for example, all items flagged as "To Do Today," then the change will be automatically made to all flagged items bearing the "To Do Today" flag. A color selector 460 allows for changing the color of a given flag icon. The label selector 455 allows for changing a text label used for a given group of flags. For example, a text label may be applied to a "Reminder" flag that states "Remember to generate price list." Such a labeled flag may be applied to one or more documents or document objects having information related to a price list that the user must generate. Referring to the top of the dialog 410, 420, a given flag may be deleted by selecting a desired flag 450 from the dialog, followed by a selection of the "Delete" control 430. A new flag may be created by selecting the "New Flag" control 425, followed by a selection of an icon type, an icon color and an icon label, as desired, for the new icon.

Figure 5:
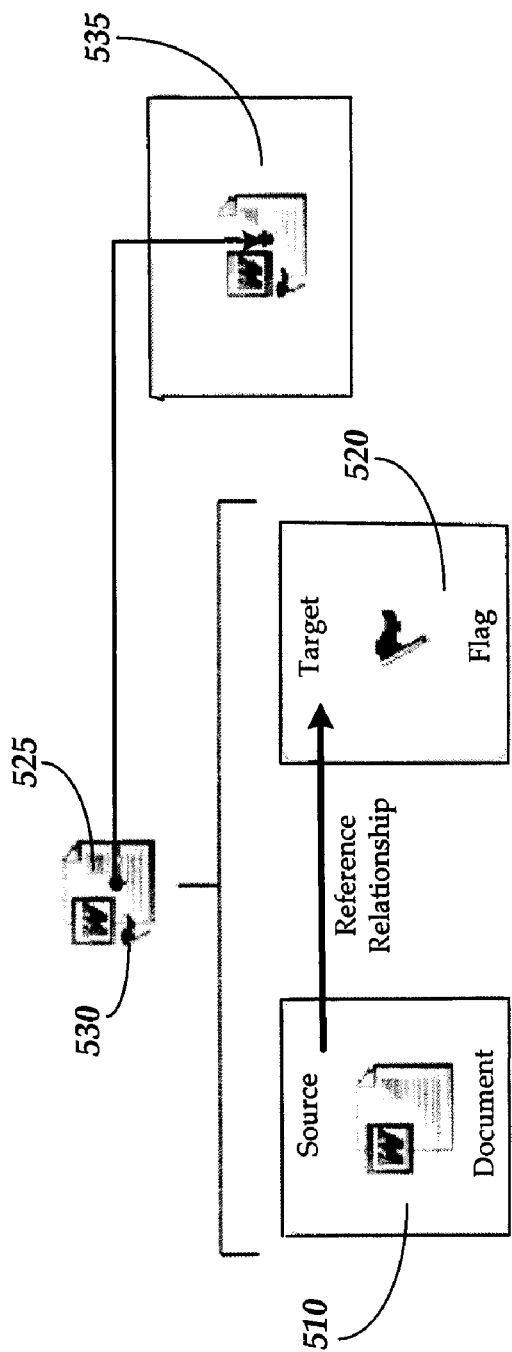
FIG. 5 is a simplified block diagram illustrating a relationship between an applied flag and a corresponding flagged document.

According to embodiments of the invention, flags may be attached or embedded. Referring now to FIG. 5, an "attached" flag refers to a situation in which a flag is referenced to another file storage system item, for example, a document or other electronic file contained in the file storage system 200. For example, a user may select a word processing document via her operating system 105 and apply a desired flag to the document, as described above with reference to FIG. 3. Alternatively, the document may be selected via an application 106*a*-106*d*. According to embodiments, flag application made to documents and/or document objects via an application 106*a*-106*d* are persisted to the file storage system 200 so that such flagged items may be viewed and accessed from the operating system 105 or from other applications 106*a*-106*d*, described herein.

Referring still to FIG. 5, when the flag type 520 is applied to the selected document 510, a reference relationship is created between the flag type and the selected document by applying metadata to a source document that points to the target flag. The flag and the referenced document become peer items in the file storage system that reference each other. Thus, a subsequent selection or sorting on the flag type applied to the document will show the associated document 510, and a selection of the document 510 will show its relationship to the applied flag. This aspect of the invention allows for quick search and retrieval of documents bearing flags because the metadata applied to the document by the flag may be used to locate the associated document.

Referring still to FIG. 5, once the flag metadata is applied to the selected document, the icon 525 visually representing the selected document is changed, and a flag icon 530 selected by the user is applied to the document icon 525. Thus, anywhere the document icon 525 is graphically represented, such as the example icon 535, the applied flag icon 530 will be displayed over the document icon to give visual notice that the document has been flagged, as described herein.

Figure 6:
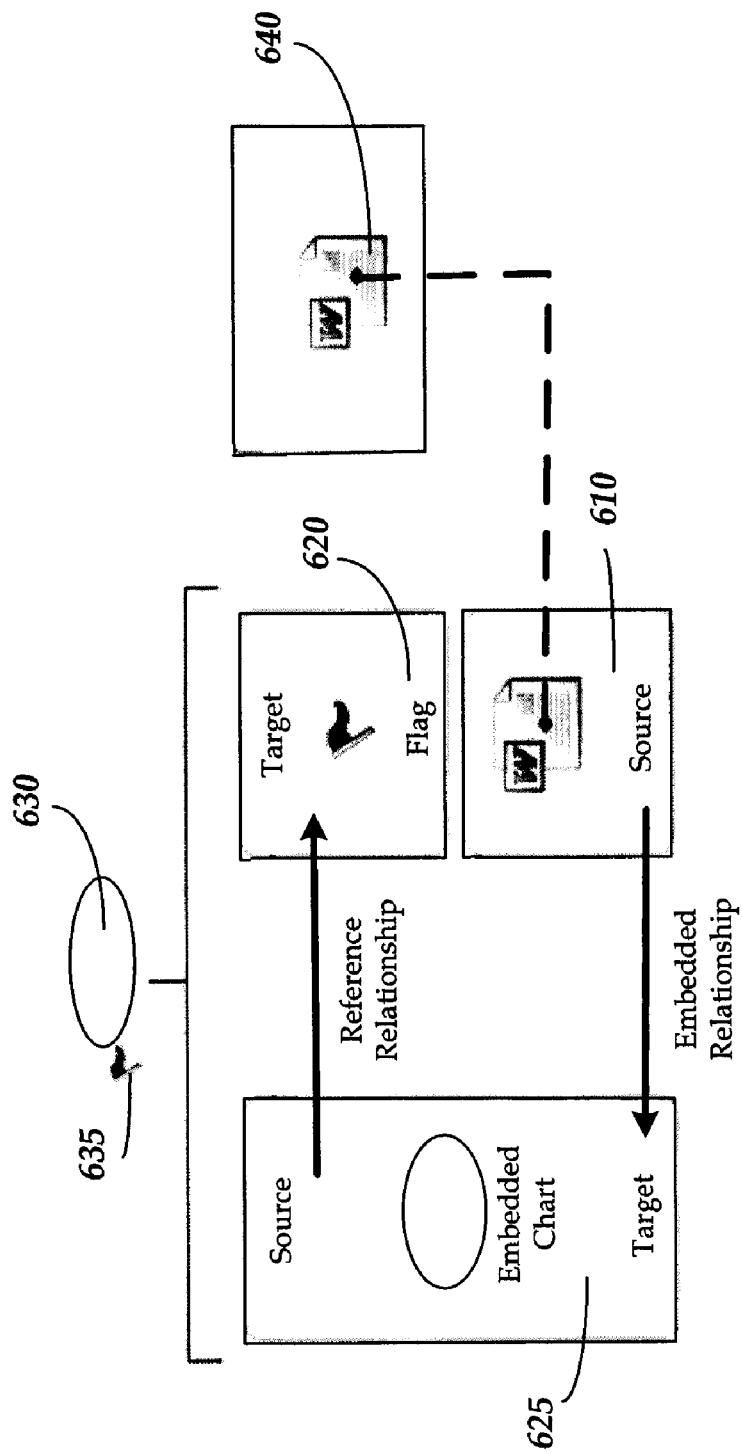
FIG. 6 is a simplified block diagram showing a relationship between an applied flag and a corresponding embedded object in an associated document.

Referring now to FIG. 6, application of an embedded flag is illustrated. An "embedded" flag refers to the situation in which a flag is applied to and referenced to an item that is inside a file storage system item. For example, an "embedded" flag is a flag applied to and referenced to a document object, for example, a chart, table or picture, embedded in a document contained in the file storage system. As should be appreciated, an embedded document object may also include a text selection, numerical value or any other property of a selected document that may be selected for application of a flag. As should be appreciated, a single document may have a number of embedded objects that are flagged with different types of flags, and each of such flagged objects will become a peer item in the file storage system with the source document and the associated flags, as described below.

Referring still to FIG. 6, when a flag is applied to an embedded object 625 contained in a source document 610, an "embedded" relationship is established between the embedded object 625 and the document 610, and the embedded object is stored to the file storage system as a peer to the source document. A "reference" relationship is established between the embedded object 625 and the flag 620 by applying metadata of the flag 620 to the embedded object. Thus, a subsequent search or sort on the applied flag will net the embedded object based on the flag metadata applied to the embedded object. Architecturally, the embedded object, the document and the flag become peer items in the file storage system. A visual representation 630 of the embedded object is generated bearing a flag icon 635, but the document icon 640 does not receive a flag icon because the flag is not attached to the document, as described above with reference to FIG. 5. Thus, subsequent visual representation of the flagged embedded object, as described below, will identify the item as a flagged embedded object rather than a flagged document.

According to embodiments of the invention, flags are portable. That is, because flags are stored in the file storage system 200 and are referenced by associated documents or document objects, the flags "travel" with the document. Thus, if a user works on a document at the office and then goes home and reopens the document from the file storage system, because the document references or points to the flag applied to the document, the document will be flagged when the user reopens the document at home. On the other hand, according to one embodiment, for the sake of privacy, flags may not pass to a receiving party to whom the associated document is electronically mailed because the flags applied to the document may conflict with flags the receiving party uses for her documents, and the flags may contain sensitive information that should not be passed to the receiving party.

Figure 7:
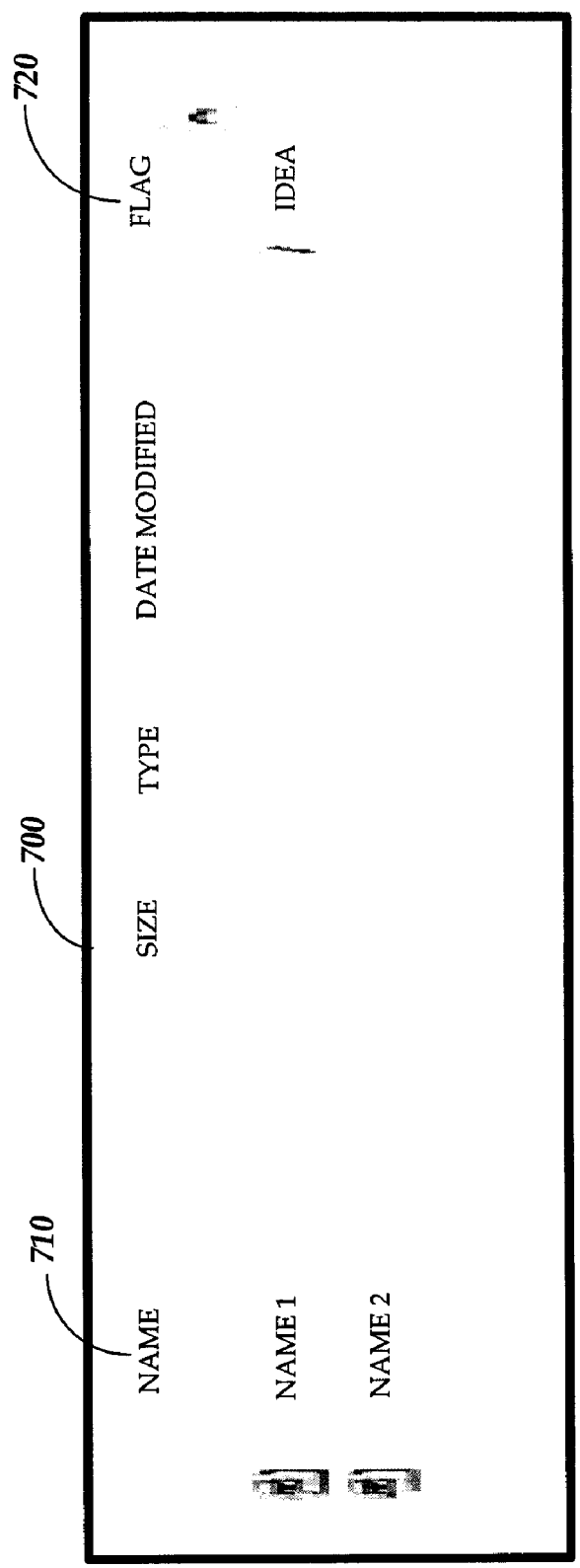
FIG. 7 illustrates a computer screen display of a flagged item summary display.

As described herein, an advantage of the claimed invention is to allow for the efficient location of flagged data. The following is a description of how flagged items are surfaced to or located by users. Referring now to FIG. 7, a flag summary 700 may be launched in the operating system user interface (shell), or at an application level via a user interface of an associated application 106*a*-106*d*. The flag summary 700 may be launched for a selected local and/or remote file storage system for providing a listing of all flagged items contained in the selected file storage system 200. According to one embodiment, a document or object "Name" column 710 provides a visual icon and label for each flagged item. If a visual representation of the flag icon is not available or is otherwise not satisfactory, a "Flag" column 720 shows a visual representation of the flag type applied to each listed document or object. As should be appreciated, if the user selects one of the listed flagged items, the selected item is automatically launched for use.

Figure 8:
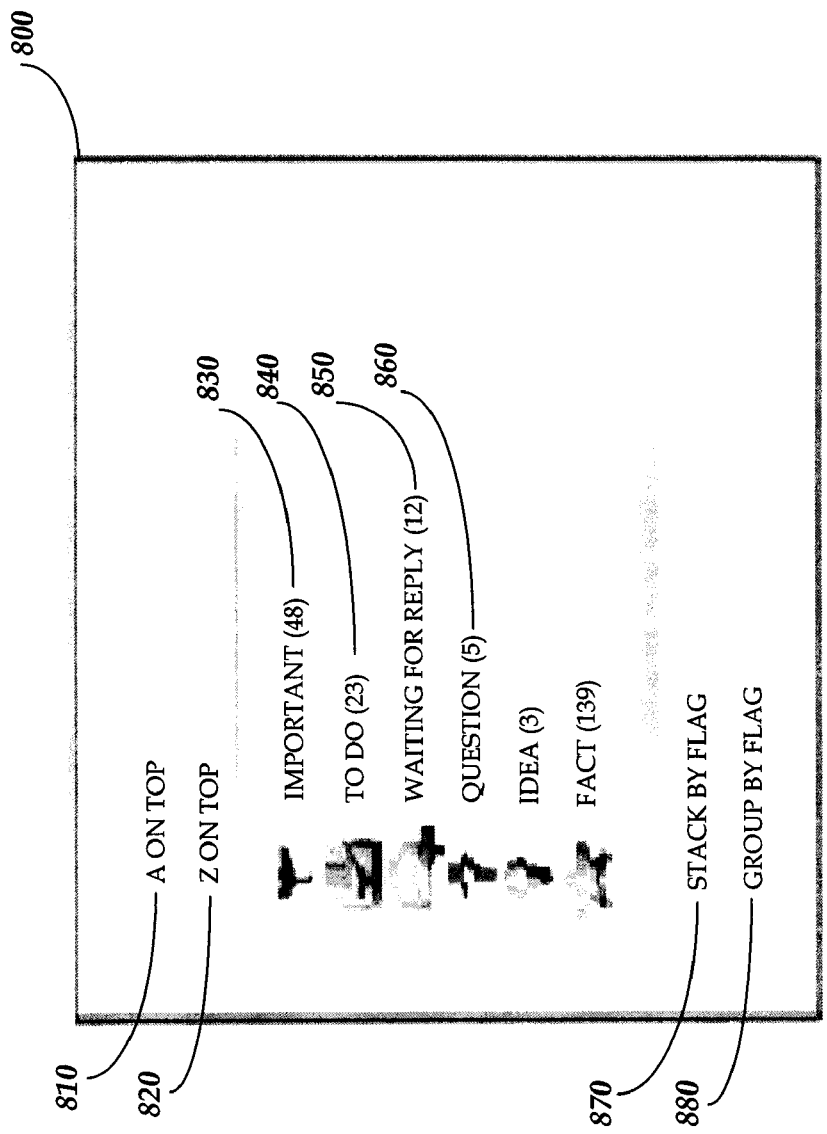
FIG. 8 illustrates a computer screen display of a dropdown menu for selectively filtering a plurality of flagged items by one or more filtering properties.

For enhancing the searching experience, the flagged items listed in the flag summary 700 may be filtered or sorted based on a number of sorting properties. FIG. 8 illustrates a computer screen display of a dropdown menu for selectively filtering a plurality of flagged items by one or more filtering properties. As illustrated in FIG. 8, a number of items in the selected file storage system bearing a given flag type are displayed next to filter controls for the different flag types. According to embodiments, the flag filter menu 800 may be deployed for selecting a sorting property for the flagged items listed in the summary 700. For example, selection of the "A on top" control 810 will sort the listed items alphabetically from A to Z. As another example, reference number 820 is the "Z on top" control. Reference number 830 is the "Important" control. Reference number 850 is the "Waiting for Reply"

control. Selection of the "To Do" control 840 will group all items bearing a "To Do" flag together and will list those items at the top of the summary 700. Selection of the "Question" control 860 will group all items bearing a "Question" flag and will place that grouping at the top of the summary 700. Thus, if a user desires to locate all flagged items bearing a given flag, for example, the "Question" flag, the user may sort the listed items on that flag and automatically receive a list of all desired items across the selected file storage system. The user may then select one or more of the listed items for use.

Figure 9:
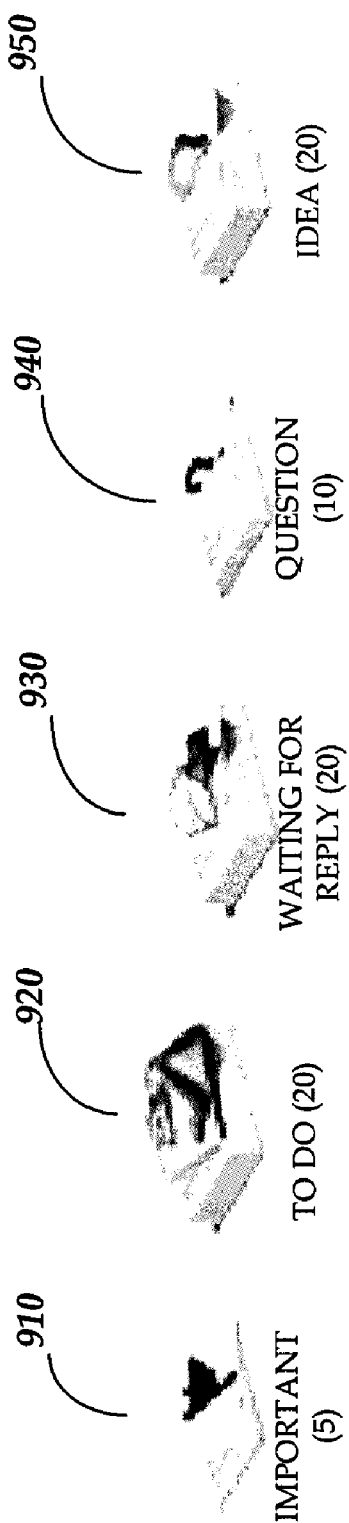
FIG. 9 illustrates one or more icons for identifying flagged items organized by stacking similarly flagged items.

The listed items may be grouped by flag type by selection of the "Group by Flag" control 880. If the "Stack by Flag" control 870 is selected, the listed items will be grouped by flag type and a visual representation of each grouping as "stacks" of related flags will be presented in the user interface in use, as illustrated in FIG. 9. The thickness of the "stacks" icons is presented visually relative to the number of items bearing the associated flag. Reference number 910 is an "Important" icon. Reference number 920 is a "To Do" icon. Reference number 930 is a "Waiting for Reply" icon. Reference number 940 is a "Question" icon. Reference number 950 is an "Idea" icon.

Figure 10:
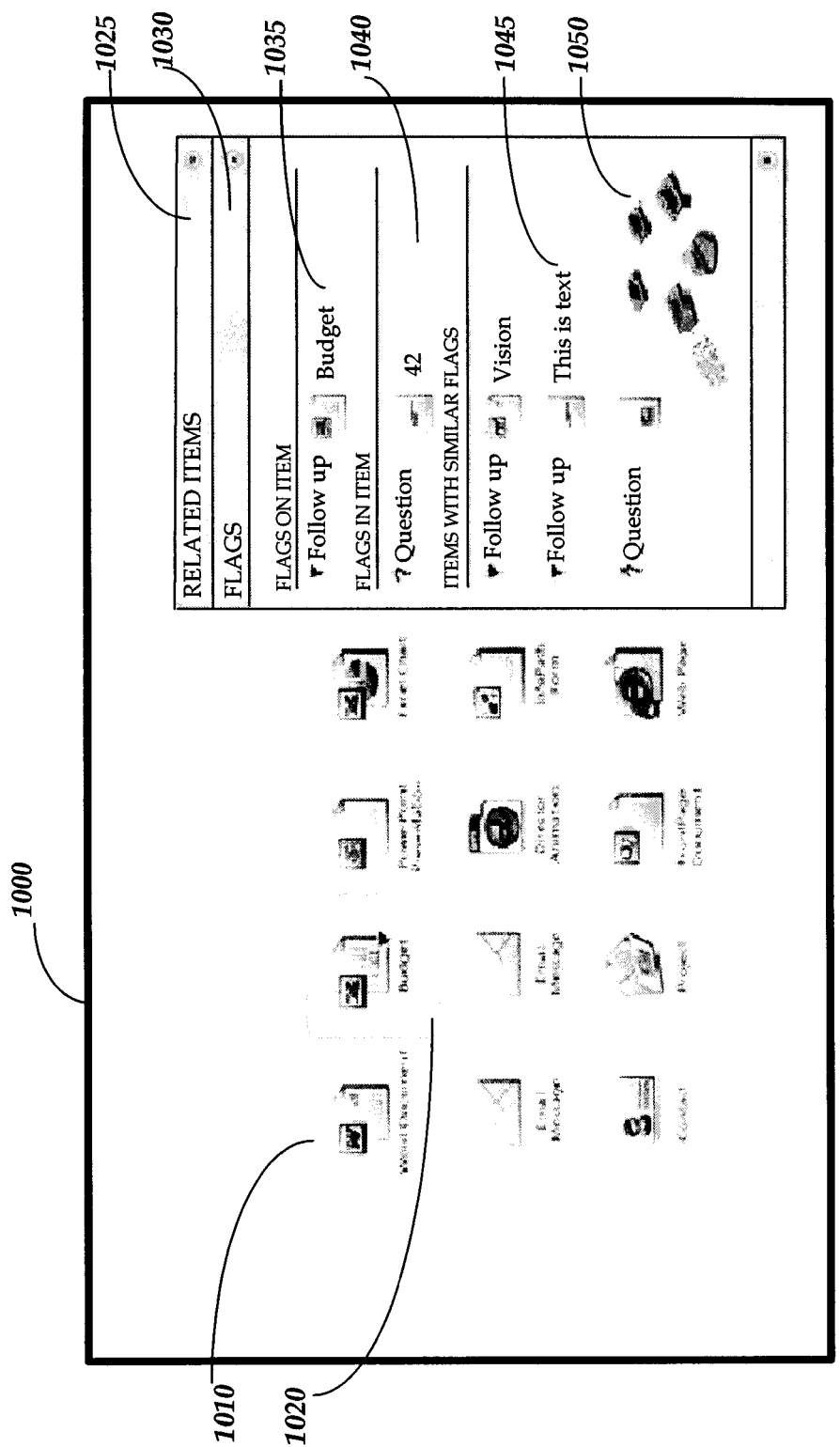
FIG. 10 illustrates a computer screen display showing a listing of electronic documents and showing an information pane for providing information about one or more flagged items that are related to a selected document and/or document object.

Referring now to FIG. 10, in addition to surfacing flagged documents and/or document objects through the flagged data summary 700, illustrated in FIG. 7, flagged documents and/or document object may also be surfaced to the user via an information pane associated with an operating system level or application level user interface. Referring to FIG. 10, an operating system user interface or shell 1000 is illustrated with which a user may access functionality of one or more applications 106a-106d via the operating system 105 and with which the user may access one or more documents, document objects, files, or other data contained in the file storage system 200, described above. As illustrated in FIG. 10, a collection of documents and other data objects 1010, 1020 is presented in the user interface or shell 1000. As should be appreciated by those skilled in the art, the collection of documents, files and other data presented in the user interface 1000 may be in response to selection of a functionality of the user interface 105 for providing the collection of documents, document objects, files or other data. For example, the user may have selected a folder in which the illustrated documents, document objects and other data are maintained. As should be appreciated, the collection of files illustrated in FIG. 10 may be a subset of the data contained in the file storage system 200, described above.

According to embodiments of the present invention, if the user selects a flagged document, for example, the flagged spreadsheet document 1020, an information pane 1025 is provided for listing all the flagged items contained in the selected document and for listing other documents and/or document objects contained in the file storage system 200 that bear related flags to the selected document 1020. For example, information pane 1025 may include flag information 1030, flags on item information 1035 and flags in item information 1040. As illustrated in FIG. 10, the listing of flagged items in the pane 1025 may include flag icons, flag text labels, or other helpful information such as text information that provides context for the related flagged document and/or document object.

Surfacing related flagged items in the manner illustrated in FIG. 10 is advantageous because the user has quick access to other documents and document objects maintained in the file storage system 200 that are related to the presently selected document. For example, if the user has selected a spreadsheet document 1020 for providing data to a group of employees, and the user notices that a similar flag is listed in the pane 1025 that is associated with a flagged text selection 1045, the user may quickly select the related flagged document or object to review the flagged document or content before or while the user is giving the presentation with the selected spreadsheet document. For example, the user may have previously flagged content in the related document concerning company management's position on the data being presented in the selected spreadsheet document, and the company management's position in the related document may have significant bearing on the presentation the user is providing with the selected spreadsheet document.

Figure 11:
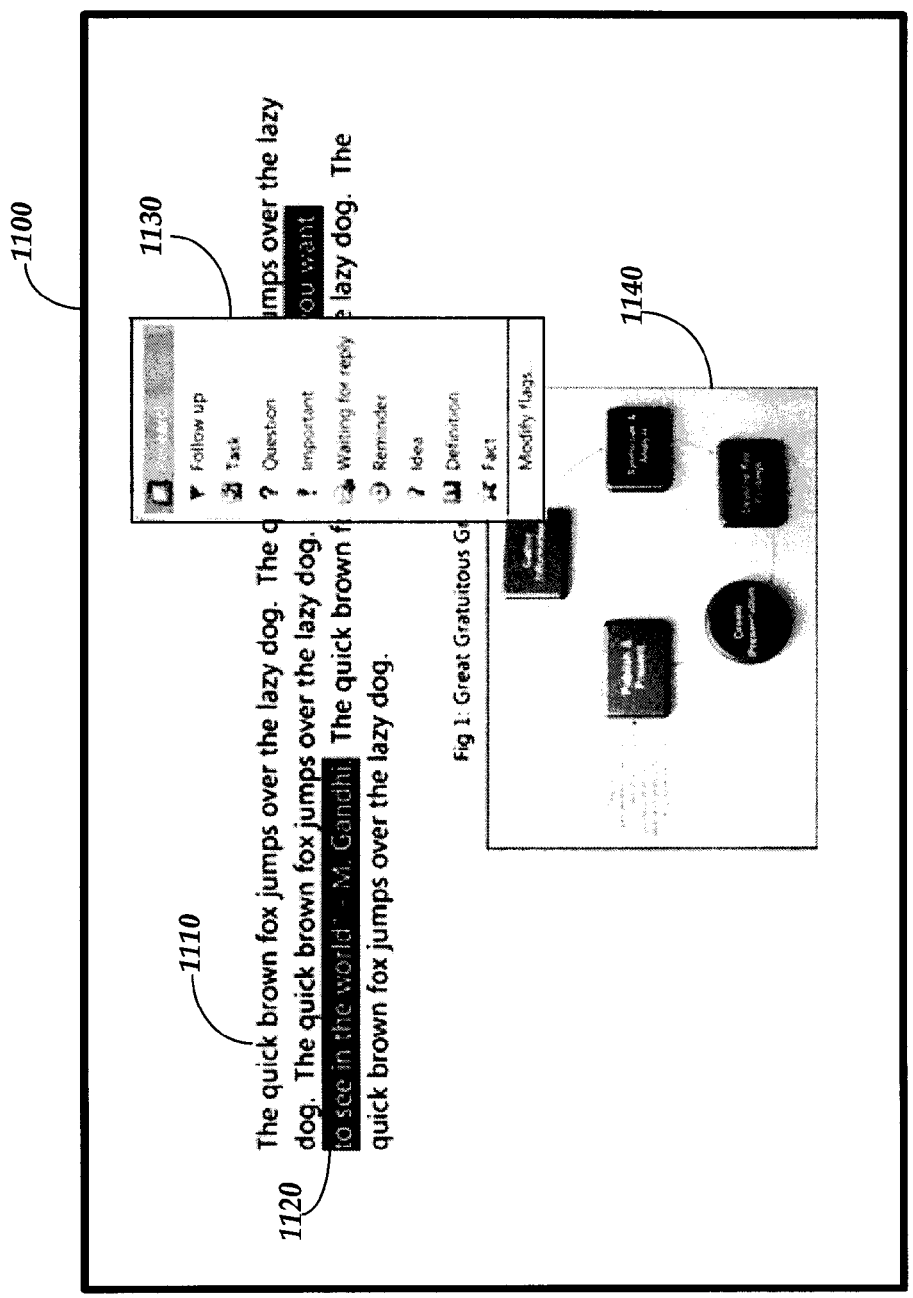
FIG. 11 illustrates a computer screen display of a word processing document containing a text selection to which a flag metadata is applied.

As described herein, embodiments of the present invention may be utilized for flagging documents and/or document objects at the operating system level and/or at the individual application level. For example, just as a document or document object may be flagged by selecting the document or document object from an operating system 105 user interface 1000, so may a document and/or document object be flagged at an application level, for example, using a word processing application, spreadsheet application, slide presentation application, calendar application, and the like. Referring to FIG. 11, a user interface 1100 of a word processing application 106a is illustrated. A document is displayed in the work area of the user interface 1100 containing a text selection 1110 and a chart object 1140. According to embodiments of the present invention, if the user desires to flag the entire document displayed in the user interface 1100, the user may deploy the flag library menu 1130 for selectively attaching metadata for a selected flag type to the document, as described above with reference to FIG. 5.

On the other hand, if the user desires to apply a desired flag to a particular document object contained in the document, the user may do so in the manner described above with reference to FIG. 6. Referring to FIG. 11, a text selection 1120 has been highlighted for application of a selected flag type to the text selection. Upon selecting a particular text item 1120, the flag library menu 1130 may be deployed by selecting the flag library menu icon, as illustrated in FIG. 11. A particular flag type may then be selected from the menu 1130, and metadata for the flag type will be applied to the selected text item, and the selected text item will become a flagged embedded object in the file storage system 200, as described above with reference to FIG. 6.

Figure 12:
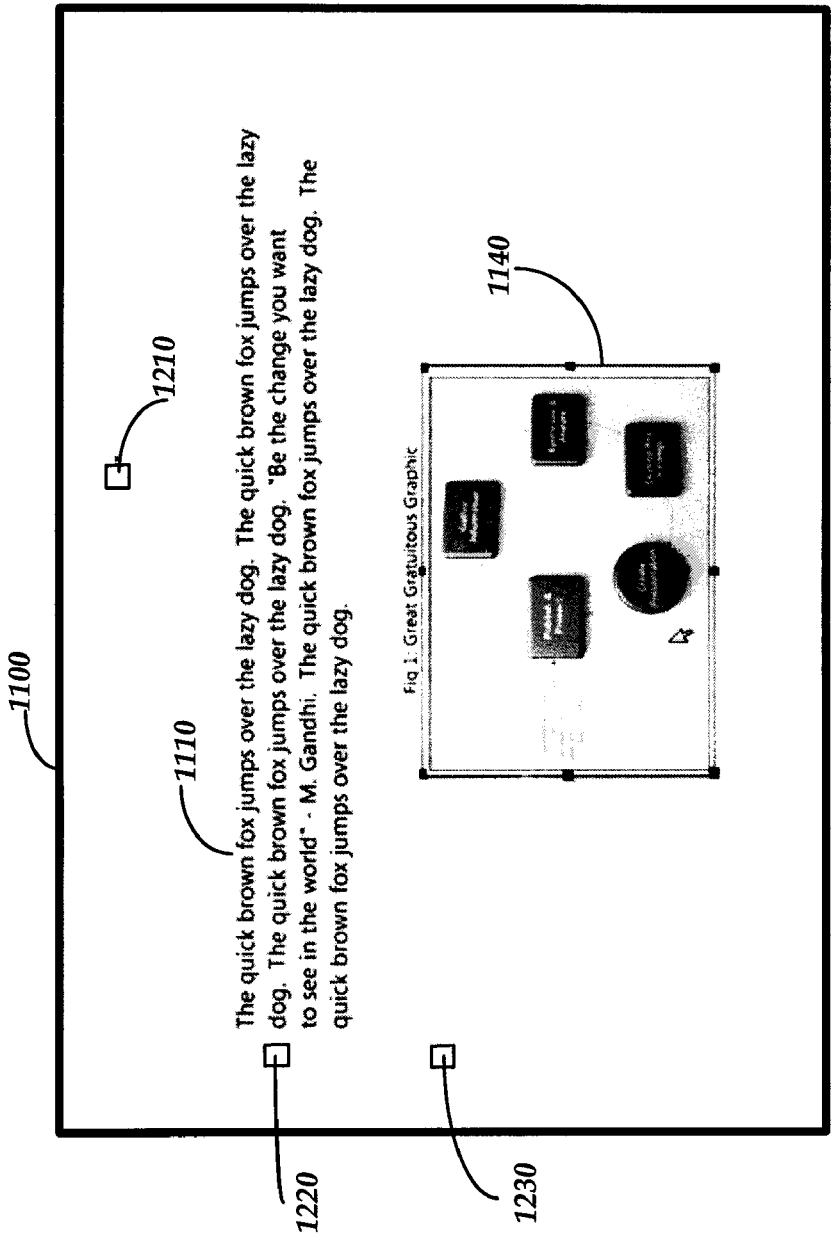
FIG. 12 illustrates a computer screen display of an electronic document containing an embedded chart object to which a flag metadata is applied.

Referring now to FIG. 12, if the user next decides to flag the chart object 1140 according to a given flag type, the user may repeat the process described above by first selecting the chart object 1140, followed by selecting a desired flag type from the flag library menu 1130. Once the desired flag type is selected from the flag library menu, the chart object will become an embedded flagged document object, as described above with reference to FIG. 6. Once one or more objects within a document are flagged as embedded flagged objects, as described above, icons 1220, 1230 are displayed in the document for identifying the location of flagged objects contained in the document. According to one embodiment, if the icons 1220, 1230 are focused on, for example, by mouse-over focus, the flagged content, for example, the text selection 1120 or the chart object 1140, is highlighted to show the user the content in the document associated with the flag. In addition, the flag library menu icon 1210, illustrated in the toolbar of the user interface 1130, is dynamically changed to visually indicate the last flag applied to a document and/or document object.

Figure 13:
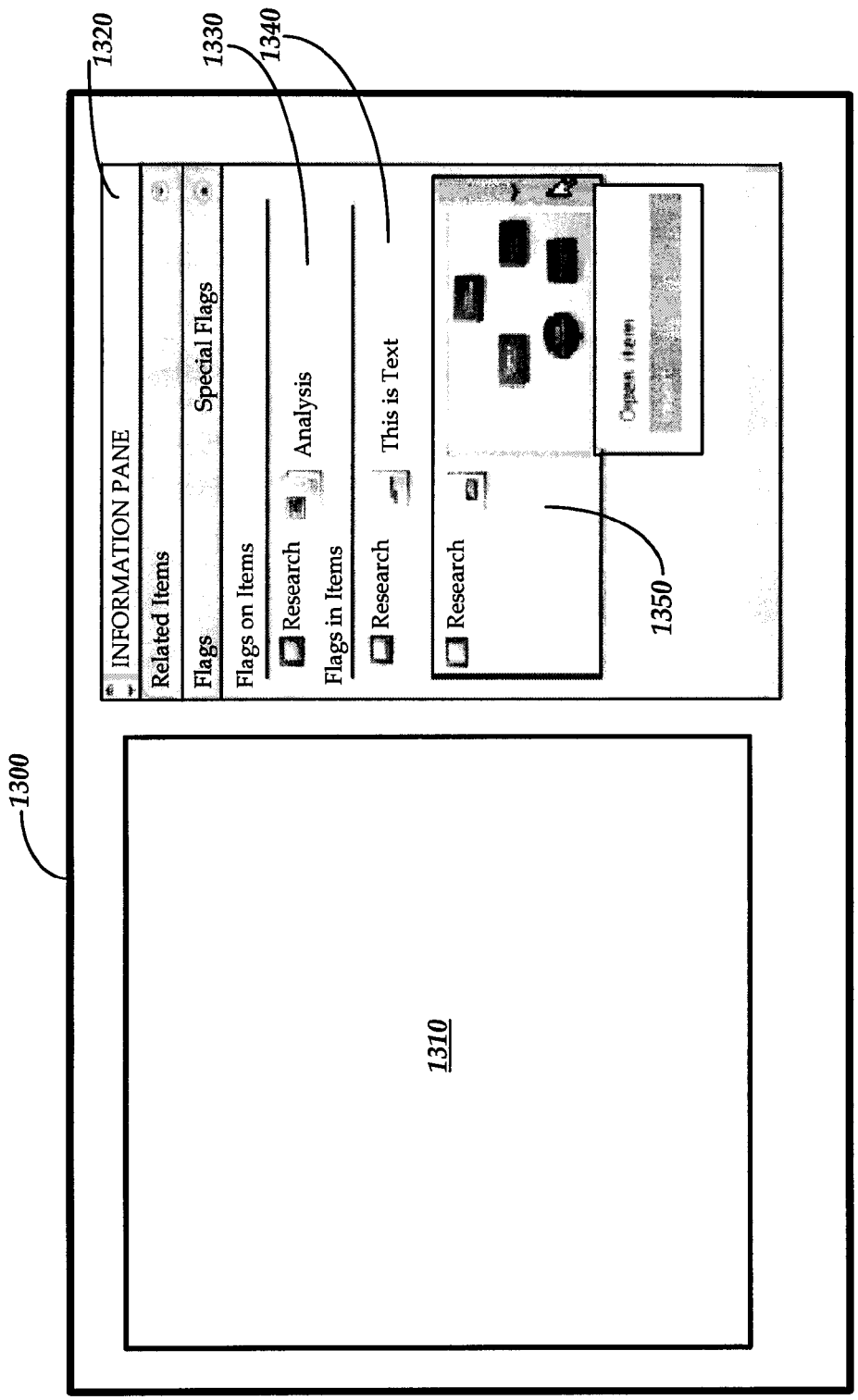
FIG. 13 illustrates a computer screen display of an electronic document being generated in association with a listing of flagged documents and/or document objects provided in an adjacent information pane.

As described herein, an advantageous aspect of embodiments of the present invention is the ability to quickly and efficiently retrieve flagged content. For example, information pane 1320 may include flags on item information 1330, flags in item information 1340. Flags in item information 1340 may include research flag information 1350. Referring now to FIG. 13, an example user interface 1300 of a slide presentation application 106*c* is illustrated. In the user interface 1300, an information pane 1320 is provided for allowing a user to quickly search for flagged content. For example, the user may search on specific flag types, for example, "Question" flags, "Research" flags, "Reminder" flags, and the like. For example, say that the user has spent the last three weeks researching various documents for information on a given topic that must now be incorporated into a slide presentation to present to his employer. Each time the user finds a particular document or document object of interest to the user, the user flags the document or an embedded object in a document with a "Research" flag. Now, the user is ready to prepare the slide presentation to present to his employer.

According to embodiments of the present invention, the user may launch the slide presentation application user interface 1300, followed by launching the information pane 1320. The user may then conduct a search of the file storage system 200 for all documents and/or document objects flagged with the "Research" flag. As a result, all "Research" flagged documents and/or document objects will be listed in the information pane 1320. The user may then select one or more of the flagged documents and/or document objects listed in the information pane 1320, and the user may then select information from the flagged documents for importing directly into the slide presentation 1310. Thus, the user is not required to perform individual searches for each document the user has previously located and marked as having information applicable to the present slide presentation application. All the user's flagged documents and/or document objects found during her research are made quickly and efficiently available to the user in the information pane 1320.

As described herein, methods, systems and computer products are provided for decorating documents and document objects with flag metadata for enhancing subsequent search and retrieval of flagged items. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for obtaining other documents of an operating system file storage via flags, the method comprising:

providing a flag library storage that includes a plurality of pregenerated flags that include metadata indicating a flag type, wherein the flag library is stored independently of any document files, wherein the plurality of flags are independent of any document file type;

providing a file storage accessible from an operating system of a computing device, wherein the file system includes a plurality of document files having a plurality of file types based on a plurality of respective applications associated with the operating system;

providing an operating system user interface;

receiving a selection in the operating system user interface of at least one of the document files in the file system;

identifying, in association with the at least one selected document file, flag type metadata stored with the selected document file that points to the flag library storage, wherein the flag type metadata points to at least one flag applied to the selected document file and at least one flag applied to an individual document object embedded within the at least one selected document file;

searching the file storage for any document files related to the at least one flag applied to the selected document file;

searching the file storage for any individual document objects related to the at least one flag applied to the individual document object;

populating the operating system user interface with icons of:

any other documents files having a flag related to the at least one flag applied to the selected document file, and any other individual document objects having a flag related to the at least one flag applied to the individual document object.

2. The method of claim 1, wherein the operating system user interface is a different user interface than any user interface association with any of the respective applications.

3. The method of claim 1, further comprising accessing a flag library menu of the flag library storage from the operating system user interface, receiving a selection of a flag type in the flag library menu, and applying flag type metadata that points to the selected flag type to at least one file document of the operating system user interface.

4. The method of claim 1, further comprising accessing a dialog pane of the flag library storage from the operating system user interface, wherein the dialog pane includes a listing of flag types and a count of document files having a respective flag type within the file storage of the operating system.

5. The method of claim 4, wherein the dialog pane of the flag library storage includes an icon selection field, a color selection field and a label selection field.

6. The method of claim 1, further comprising filtering the operating system user interface by flag type.

7. A system for obtaining other documents of a operating system file storage via flags, the system comprising:

a processor; and a memory having computer-executable instructions stored thereon, wherein the computer-executable instructions are configured for:

providing a flag library storage that includes a plurality of pregenerated flags that include metadata indicating a flag type, wherein the flag library is stored independently of any document files, wherein the plurality of flags are independent of any document file type;

providing a file storage accessible from an operating system of a computing device, wherein the file system includes a plurality of document files having a plurality of file types based on a plurality of respective applications associated with the operating system;

providing an operating system user interface, wherein the operating system user interface includes a document file icon pane and a document tag pane;

receiving a selection in the document file icon pane of the operating system user interface of at least one of the document files in the file system;

determining whether the at least one selected document file includes type metadata that points to one of the plurality of flags located in the flag library storage that is stored independently from any document files, wherein the flag type metadata includes metadata applied to the document file in entirety stored in a peer relationship with metadata embedded in the document file and applied to one document object embedded in of the document file;

when the at least one selected document file includes flag type metadata that points to one of the plurality of flags located in the flag library and the metadata is applied to the document file in entirety:
  determining the flag type based on the flag type metadata, and
  populating the document tag pane with icons of at least one other document file having a same flag type, wherein the at least one other document file has a file type different than the at least one selected document file, wherein a respective application of the at least one other document file is different than a respective application of the at least one selected document file;
when the at least one selected document file includes flag type metadata that points to one of the plurality of flags located in the flag library and the flag type metadata embedded in the document file is applied to the one document object embedded within the document file:
  determining the flag type based on the flag type metadata, and
  populating the document tag pane with a quantity of embedded flags in any other document of the file storage in having a flag related to the flag type.

8. The system of claim 7, wherein the operating system user interface is a different user interface than any user interface association with any of the respective applications.

9. The system of claim 7, further comprising accessing a flag library menu of the flag library storage from the operating system user interface, receiving a selection of a flag type in the flag library menu, and applying flag type metadata that points to the selected flag type to at least one file document of the operating system user interface.

10. The system of claim 7, further comprising accessing a dialog pane of the flag library storage from the operating system user interface, wherein the dialog pane includes a listing of flag types and a count of document files having a respective flag type within the file storage of the operating system.

11. The system of claim 10, wherein the dialog pane of the flag library storage includes an icon selection field, a color selection field and a label selection field.

12. The system of claim 7, further comprising filtering the operating system user interface by flag type.

13. The system of claim 7, wherein the at least one selected document includes flag type metadata that points to a plurality of flags located in the flag library storage.

14. A computer-readable storage medium having computer-executable instructions to cause a processor to obtain other documents of an operating system file storage via flags, the instructions comprising:
  providing a flag library storage that includes a plurality of pregenerated flags that include metadata indicating a flag type, wherein the flag library is stored independently of any document files, wherein the plurality of flags are independent of any document file type;
  providing a file storage accessible from an operating system of a computing device, wherein the file system includes a plurality of document files having a plurality of file types based on a plurality of respective applications associated with the operating system;
  providing an operating system user interface, wherein the operating system user interface includes a document file icon pane and a document tag pane;
  receiving a selection in the document file icon pane of the operating system user interface of at least one of the document files in the file system;
  identifying, in association with the at least one selected document file, flag type metadata stored with the selected document file that points to the flag library storage, wherein the flag type metadata points to at least one flag applied to the selected document file and at least one flag applied to an individual document object embedded within the at least one selected document file;
  searching the file storage for any document files related to the at least one flag applied to the selected document file;
  searching the file storage for any individual document objects related to the at least one flag applied to the individual document object;
  populating the operating system user interface with icons of:
    any other documents files having a flag related to the at least one flag applied to the selected document file, and
    any other individual document objects having a flag related to the at least one flag applied to the individual document object.

15. The computer readable storage medium of claim 14, further comprising accessing a flag library menu of the flag library storage from the operating system user interface, receiving a selection of a flag type in the flag library menu, and applying the flag type metadata that points to the selected flag type to at least one file document of the operating system user interface.

16. The computer readable storage medium of claim 14, further comprising accessing a dialog pane of the flag library storage from the operating system user interface, wherein the dialog pane includes a listing of flag types and a count of document files having a respective flag type within the file storage of the operating system.

17. The computer readable storage medium of claim 16, wherein the dialog pane of the flag library storage includes an icon selection field, a color selection field and a label selection field.

18. The computer readable storage medium of claim 14, further comprising filtering the operating system user interface by flag type.

* * * * *